United States Patent
Nguyen et al.

(10) Patent No.: US 11,062,024 B2
(45) Date of Patent: Jul. 13, 2021

(54) COMPUTER-SECURITY EVENT SECURITY-VIOLATION DETECTION

(71) Applicant: CrowdStrike, Inc., Irvine, CA (US)

(72) Inventors: Cory-Khoi Quang Nguyen, Lafayette, IN (US); John Lee, Cleveland, OH (US)

(73) Assignee: CrowdStrike, Inc., Irvine, CA (US)

( * ) Notice: Subject to any disclaimer, the term of this patent is extended or adjusted under 35 U.S.C. 154(b) by 242 days.

(21) Appl. No.: 16/192,251

(22) Filed: Nov. 15, 2018

(65) Prior Publication Data

US 2020/0159916 A1   May 21, 2020

(51) Int. Cl.

| G06F 21/00 | (2013.01) |
| G06F 21/55 | (2013.01) |
| G06F 40/284 | (2020.01) |
| G06F 40/157 | (2020.01) |
| G06F 9/54 | (2006.01) |
| G06F 11/30 | (2006.01) |

(Continued)

(52) U.S. Cl.
CPC ............ *G06F 21/554* (2013.01); *G06F 9/542* (2013.01); *G06F 11/3006* (2013.01); *G06F 11/3072* (2013.01); *G06F 21/566* (2013.01); *G06F 40/157* (2020.01); *G06F 40/284* (2020.01); *G06K 9/6267* (2013.01); *G06N 3/02* (2013.01); *H04L 63/1416* (2013.01); *H04L 63/1441* (2013.01); *G06F 2201/86* (2013.01); *G06F 2201/875* (2013.01)

(58) Field of Classification Search
CPC ...... G06F 21/554; G06F 21/566; G06F 9/542; H04L 63/1416; H04L 63/1441
See application file for complete search history.

(56) References Cited

U.S. PATENT DOCUMENTS

| 2009/0307452 | A1* | 12/2009 | Hahn | .................. G06F 21/78 711/164 |
| 2017/0063884 | A1* | 3/2017 | Seigel | ................. H04L 63/1425 |
| 2017/0244754 | A1 | 8/2017 | Kinder et al. | |

FOREIGN PATENT DOCUMENTS

WO       WO03090019 A2    10/2003

OTHER PUBLICATIONS

The Extended European Search Report dated Mar. 23, 2020 for European Patent Application No. 19207848.3, 6 pages.

(Continued)

*Primary Examiner* — Jeffrey C Pwu
*Assistant Examiner* — Thong P Truong
(74) *Attorney, Agent, or Firm* — Lee & Hayes, P.C.

(57) ABSTRACT

Example techniques herein determine that an event associated with a monitored computing device is associated with a security violation. Terms are extracted from at least two command lines associated with the event. Term representations of the at least two terms are determined based at least in part on a trained representation mapping. Two or more first filter outputs are determined based at least in part on the term representations of terms in a respective first subset of the terms. An indication of whether the event is associated with a security violation is determined at least partly by operating a trained classification computational model (CM) based at least in part on the two or more first filter outputs. Various examples train a word2vec or other x2vec model to provide the representation mapping. Various examples train a CM having convolutional and classification sections to provide the indication.

18 Claims, 11 Drawing Sheets

(51) Int. Cl.
  *G06F 21/56* (2013.01)
  *G06K 9/62* (2006.01)
  *G06N 3/02* (2006.01)
  *H04L 29/06* (2006.01)

(56) References Cited

OTHER PUBLICATIONS

Kim, Y., "Convolutional Neural Networks for Sentence Classification", Sep. 3, 2014, 6 pages.
Le, et al., "Distributed Representations of Sentences and Documents", Proceedings of the 31st International Conference on Machine Learning, 2014, 9 pages.
McCormick, C., Word 2 Vec Tutorial—The Skip-Gram Model, Apr. 19, 2016, retrieved Oct. 24, 2018 from <<http://mccormickml.com/2016/04/19/word2vec-tutorial-the-skip-gram-model/>>, 14 pages.
Mikolov, "Distributed Representations of Words and Phrases and Their Compositionality", Oct. 16, 2013, 9 pages.
Mikolov, et al., "Efficient Estimation of Word Representations in Vector Space", Sep. 7, 2013, 12 pages.
Radford, et al., "Learning to Generate Reviews and Discovering Sentiment", OpenAI, Apr. 6, 2017, 9 pages.
Van Der Maaten, et al., "Visualizing Data Using t-SNE", Journal of Machine Learning Research, Nov. 2008, vol. 9, 27 pages.

\* cited by examiner

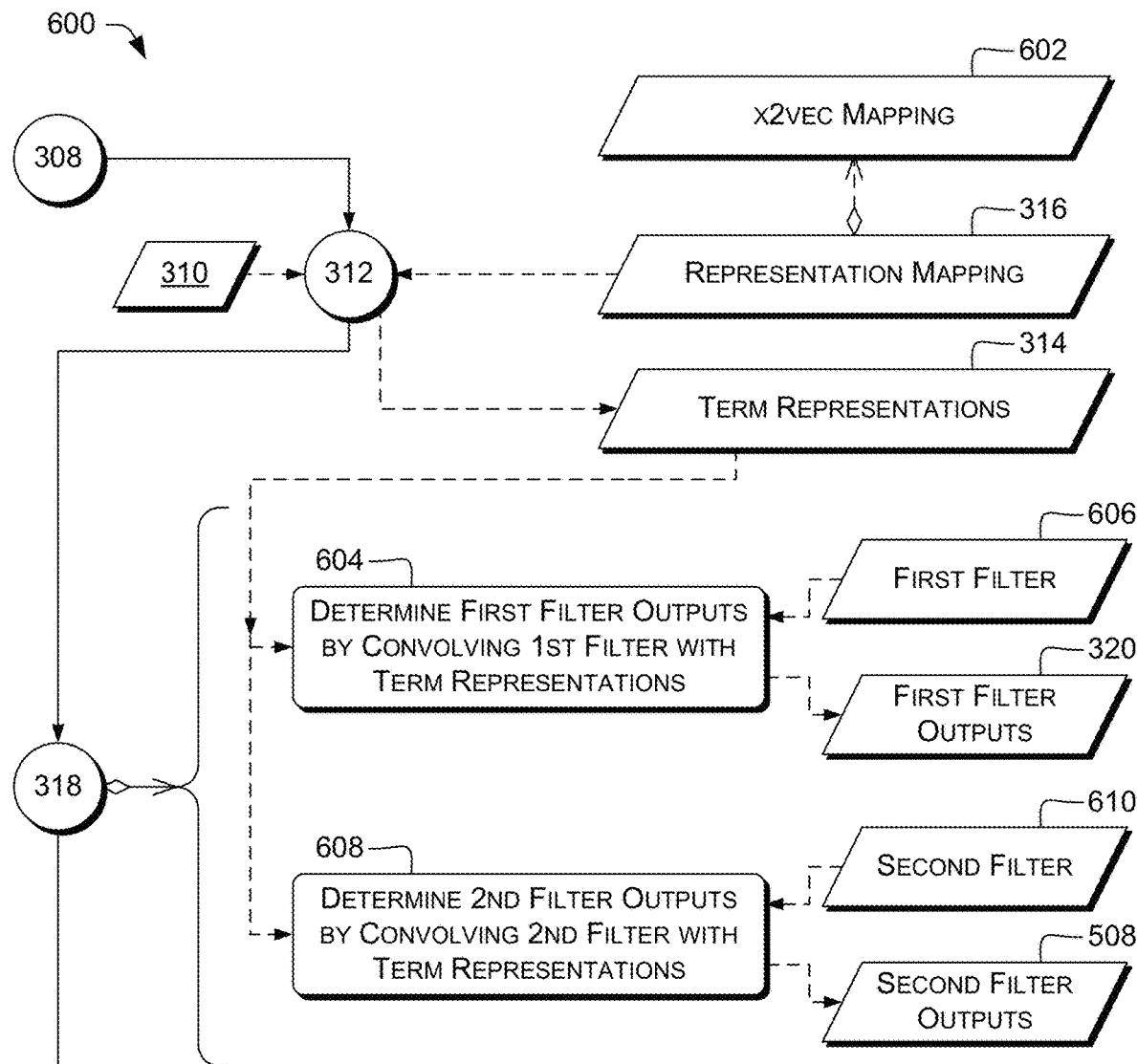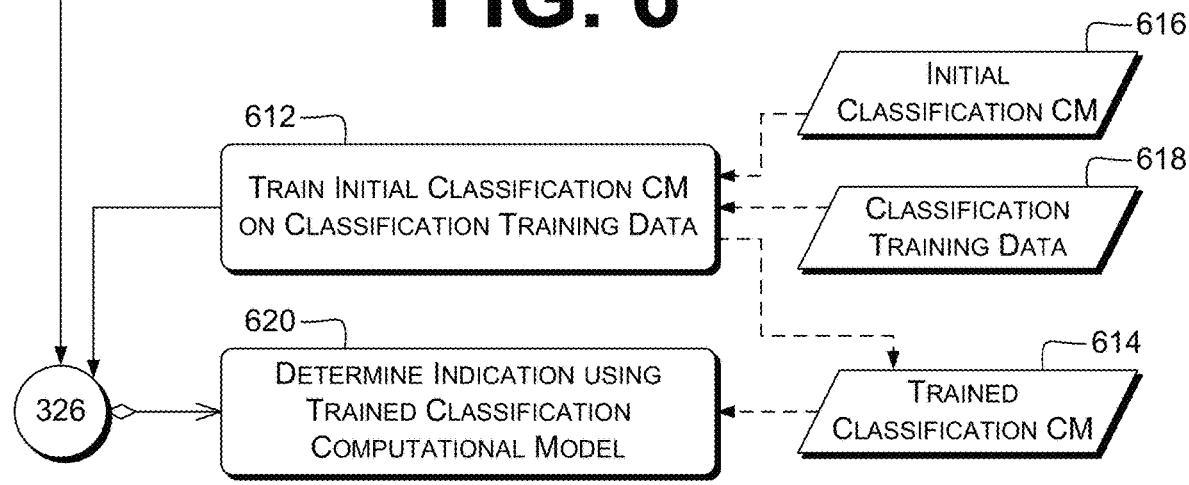
FIG. 6

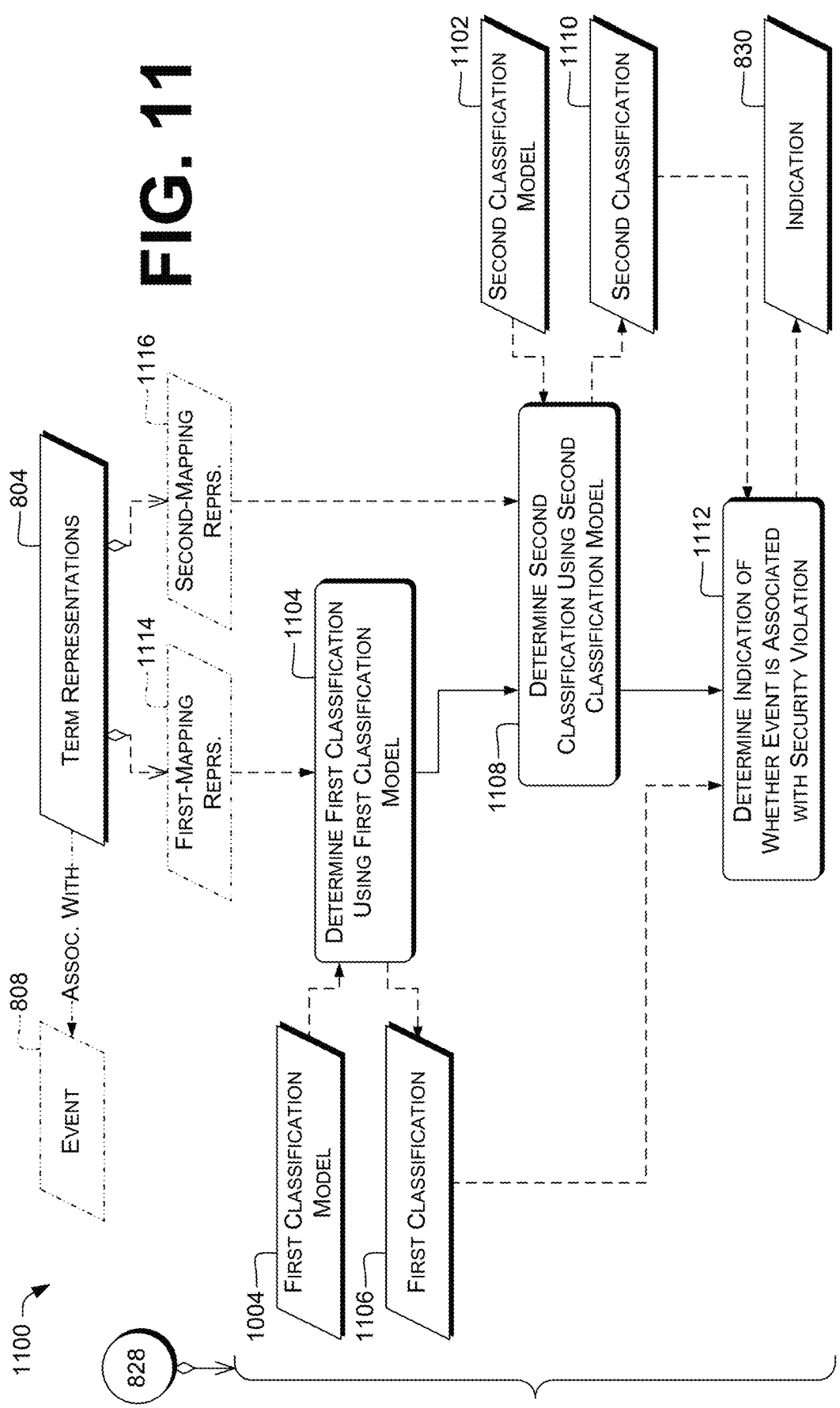

US 11,062,024 B2

COMPUTER-SECURITY EVENT SECURITY-VIOLATION DETECTION

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, macros or scripts embedded in document files, steganographic encodings within media files such as images, or other types of computer programs, or combinations thereof.

Another type of cyber attack is a "targeted" attack, e.g., by an adversary operating as an advanced persistent threat (APT). Targeted attacks often attempt to gain command-line access to target systems. Targeted attacks may use malware, or may use other techniques that do not require running malware on target systems. Examples include phishing and exploits that compromise benign software. For example, a benign program with administrative privileges may be compromised using a remote zero-day attack to provide an adversary with unauthorized administrative access to a system, even without the use of malware. Additionally or alternatively, an adversary may steal the credentials of a legitimate user, access the system as that user, and then elevate privilege level (e.g., using those credentials, or by exploiting a vulnerability). This may permit the adversary to use normal administrative tools, but without authorization. Given the wide variety of attack types, it is challenging to determine if activity taking place on a computer is malicious.

As used herein, the terms "adversary" or "adversaries" include not only malware developers but also exploit developers, builders and operators of an attack infrastructure, those conducting target reconnaissance, those executing targeted operations, those performing data exfiltration, those maintaining persistence in the network, etc. Thus the "adversaries" can include numerous people or other entities that are all part of an "adversary" group.

To counter these threats, governments, enterprises, and individuals use a range of security applications and services. Typically, these applications and services scan a device for a signature of a security exploit such as a piece of malware. Responsive to finding the signature, the applications and services quarantine or delete the exploit. The applications and services often miss more sophisticated security violations, however, and often the applications and services are not configured to detect violations or take any actions until malware or another exploit has gained a foothold on a device.

For example, actions taken by malicious code to manipulate a device (e.g., exploiting a vulnerability in the device) are often also actions commonly taken by benign code. Therefore, some current measures do not attempt to take preventative measures at initial stages of an exploit. Other schemes are limited to alerting a user, due to the high likelihood of confusion of a benign action with a malicious one. Such failures to take action can result in further damage, loss, or difficulty in removing an exploit.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

FIG. 6 is a dataflow diagram that illustrates example techniques for determining and operating computational model(s).

FIG. 11 is a dataflow diagram that illustrates example techniques for operating multiple computational models, e.g., to determine whether an event is associated with a security violation.

DETAILED DESCRIPTION

Overview

Figure 1:
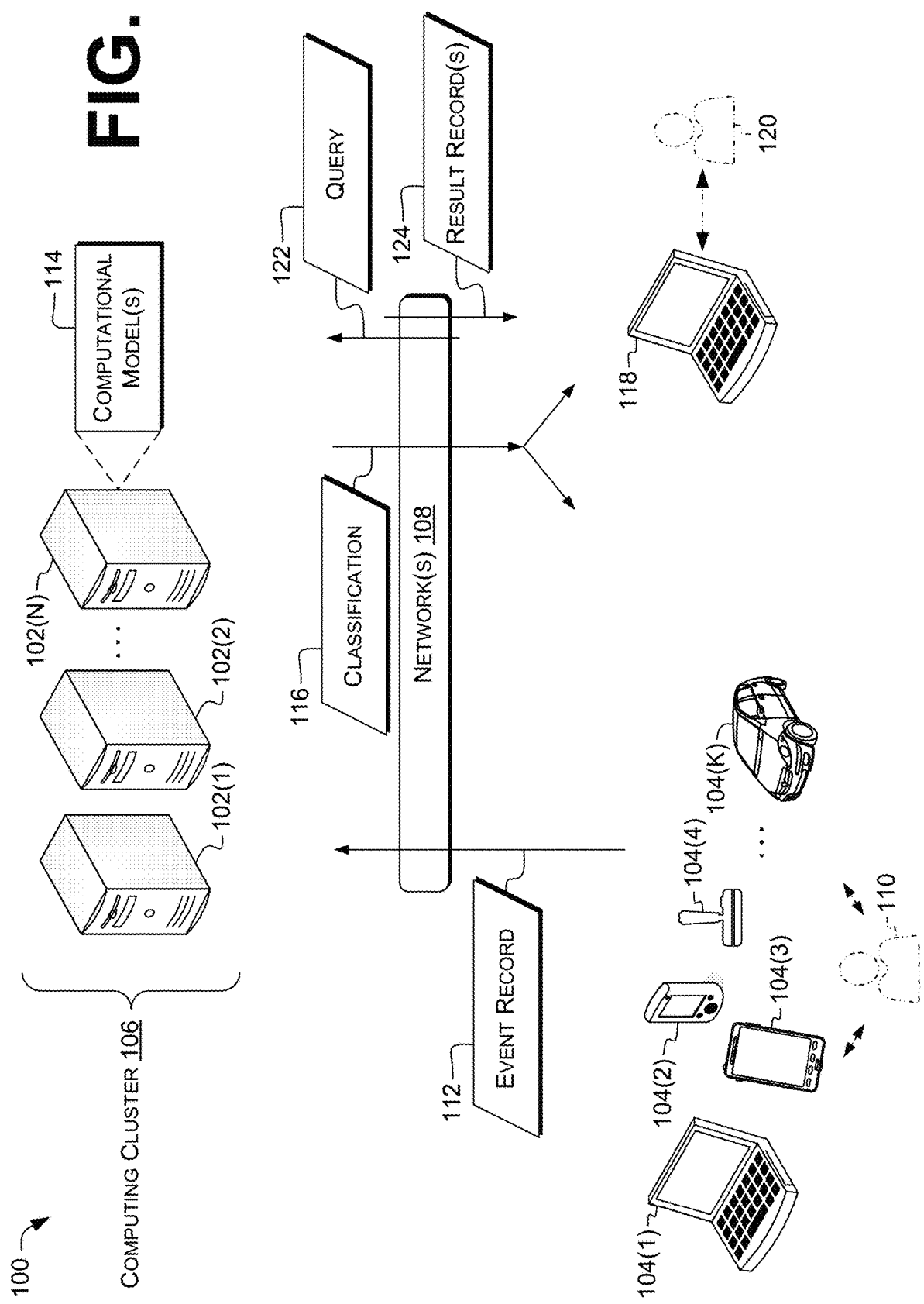
FIG. 1 is a block diagram depicting example scenarios for determining and operating computational model(s) as described herein.

Some examples herein relate to classification of events occurring at a monitored computing device to determine whether those events are malicious, e.g., associated with a security violation. Throughout this document, "dirty" is used to refer to events associated with malware, security violations, or other malicious behavior (e.g., any of the examples listed in the Background); feature vectors representing such events; or other values associated with, produced by, or indicative of malware, malicious behavior, or other security violations (e.g., activity by an APT adversary). "Clean" is used to refer to events or values that are not dirty. A "false detection" or "false positive" is a determination that an event is associated with malware when, in fact, that event is not associated with malware, or the event that is the subject of such a determination. A "false miss" or "false negative" is a determination that an event is not associated with malware when, in fact, that event is indeed associated with malware, or the event that is the subject of such a determination. Various examples herein permit reducing the occurrence of false misses by, once a false miss occurs, determining a classification computational model that can be used to prevent the same or similar false misses from occurring again. Various examples permit reducing the incidence of false detections or other noise in security operations such as monitoring compared to some prior schemes. Throughout this document, unless otherwise specified, references to an event can refer to a sequence of events that are represented by a single higher-level event. That is, an event can represent any number or arrangement of subsidiary events. In some examples, an event is an example of the Component in the Composite design pattern.

Throughout this document, a "data stream" can include data stored in, e.g., a file, a disk boot sector or partition root sector, or a block of memory, or a portion thereof. For brevity, the term "sample" herein refers to a data stream, or a portion of a data stream, being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample. Some examples determine or use a classification indicating, e.g., characteristics of a sample (e.g., a data stream) or an event related thereto.

In some examples, each of one or more monitored computing devices is equipped with a security agent (e.g., a service or daemon process) to monitor events on that device. Those monitored computing devices may be in communication with devices of a security service system, e.g., implemented using cloud technology. The security service system can filter and analyze events, and present to security analysts only events associated with security violations. This can, e.g., reduce the volume of events from thousands per second to a few per minute, permitting analysts to triage and research the suspicious events. Some examples perform this filtering based on behavior, permitting the detection of previously-unknown threats.

While example techniques described herein may refer to analyzing events that may potentially be malicious, it is understood that the techniques may also apply to other types of events, e.g., produced by non-malicious software, processes, or other system components. For example, techniques described herein can be used in determining which processes are accessing particular files or other system resources, or in analyzing causes of excess resource usage by processes. Accordingly, analysis of events as discussed herein may be used by, for example, anti-malware security researchers, white-hat vulnerability researchers, interoperability developers, anti-piracy testers, or other analysts of data streams. In some examples, the described techniques are used to detect, and prevent execution of, malicious actions at a computer. In some examples, techniques described herein can be used to detect malicious activity without requiring detection of a specific software package or version. This can provide increased robustness against polymorphic malware and against zero-day exploits used by APT adversaries. Some examples are described with reference to malware, but techniques described herein are not limited to files or events associated with malware.

Various entities, configurations of electronic devices, and techniques for determining and operating computational models, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs). As used herein, a "random" value can be a truly random value, e.g., measured from physical phenomena, or a pseudorandom value. Examples of random values include cryptographically-strong random numbers.

In some examples, the techniques discussed herein can be implemented on or for a monitored computing device and can include detecting an event, e.g., an action of interest (AoI), committed or triggered by an object (i.e., a function, module, process, or thread) executed by the monitored computing device. Some techniques discussed herein can detect that an event is related to a security violation based at least in part on analyzing command lines associated with that event. In some examples, the techniques can take preventative action (e.g., blocking an object associated with the event) without input from a user. This can greatly increase the ease of implementing security for a computing device and may prevent greater damage from occurring due to a violation by stopping the violation before it has progressed beyond preliminary actions or events.

For brevity and clarity herein, several Perl notations are used. "$name= . . . " defines an entity called "name" with the value " . . . ". "qr { . . . }" represents the Perl regular expression " . . . ". "q{ . . . }" represents the literal text " . . . ", except that "\ {" is replaced with "{" in " . . . ", and likewise "\ }" with "}" and "\ \" with "\". "qw { . . . }" represents the list of whitespace-delimited items in the string " . . . ". For example, qw {'hello 42' 1337} is the list with the three items "'hello", "42'", and "1337".

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein. Subsection headers in this Detailed Description are solely for convenience in reading. Some examples include features from only one subsection. Some examples include features from more than one subsection.

Illustrative Environment

FIG. 1 shows an example scenario 100 in which examples of computational-model-based systems can operate or in which computational-model determination or use techniques such as those described herein can be performed. Illustrated devices or components of scenario 100 include computing device(s) 102(1)-102(N) (individually or collectively referred to herein with reference 102), for integer N≥1, and computing devices 104(1)-104(K) (individually or collectively referred to herein with reference 104), for integer K≥1. In some examples, N=K; in other examples, N<K or N>K. Although illustrated as, e.g., desktop computers, laptop computers, tablet computers, or cellular phones, computing device(s) 102 or 104 can include a diverse variety of device categories, classes, or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (device(s) 102) that work together to accomplish a computing task assigned to the cluster as a whole. In some examples, computing device(s) 104 can be clients of cluster 106 and can submit jobs to cluster 106 or receive job results from cluster 106.

In some examples, computing devices 102 or 104 can intercommunicate or communicate with external device(s), e.g., via one or more network(s) 108, to participate in or carry out computational-model determination or operation as described herein. For example, computing device 104(1) can be or include a monitored computing device or other data source owned or operated by or on behalf of a user, and computing device 102(1) can be a computational-model determination and operation system, as described herein. Network(s) 108 can include public networks such as the Internet, private networks such as an institutional or personal intranet, or combination(s) of private and public networks. Communications between computing devices 102 or 104 via network(s) 108 can be structured, e.g., according to defined application programming interfaces (APIs). For example, data can be retrieved via network(s) 108, e.g., using a Hypertext Transfer Protocol (HTTP) request such as a GET to a Web Services or Representational State Transfer (REST) API endpoint. Remote Procedure Call (RPC) APIs or other types of APIs can additionally or alternatively be used for network communications.

In some examples, computing devices 102 or 104 interact with or are operated by an entity 110 (shown in phantom). The entity 110 can include systems, devices, parties such as users, or other features with which computing devices 102 or 104 can interact. For brevity, examples of entity 110 are discussed herein with reference to users of a computing device 104; however, these examples are not limiting.

In the illustrated example, computing devices 104 transmit event records 112 to computing devices 102. Computing devices 102 filter and otherwise handle the event records 112 to determine whether events associated with the event records 112 are associated with security violations or are otherwise suspicious. For example, computing devices 102 can operate computational model(s), CM(s), 114, to determine a model output corresponding to event(s) on a user's computing device 104. For example, the model output can include a classification 116 indicating whether the event(s) are associated with a security violation. In response to a model output indicating a security violation, computing devices 102 can apply a "tag" to each event record 112 associated with the security violation. The computing device(s) 102 can provide to computing device(s) 104 the classification 116 or other outputs of processing using computational models described herein.

In some examples, classification 116 is provided to computing device(s) 104. This can permit computing device(s) 104 to, e.g., take mitigation actions or advise entit(ies) 110 of an event associated with a security violation. Additionally or alternatively, classification 116 can be provided to computing device(s) 118 (for brevity, only one is shown), e.g., operated by entity 120 (shown in phantom). Entity 120 can be a security analyst working for a security service, in some examples. Additionally or alternatively, entity 120 can include systems, devices, parties such as users, or other features with which computing devices 118 can interact. For brevity, examples of entity 120 are discussed herein with reference to security analysts using a computing system; however, these examples are not limiting.

In some examples, computing device 118 (e.g., operated by an entity 120 such as a security analyst) can transmit a query 122 (e.g., a search query) to cluster 106. Cluster 106 can respond to computing device 118 with result record(s) 124 corresponding to event record(s) 112 satisfying the query 122. For example, query 122 can include at least one tag criterion, and result record(s) 124 can include event record(s) 112 that have been tagged with tag(s) matching the at least one tag criterion. Computing device 118 can then present at least some of the result record(s) 124 to entity 120 via a user interface.

As noted above, an event can represent multiple other events or sub-events. In some examples, classification(s) 116 or result record(s) 124 can be associated with specific event record(s) 112, or with composite events or other events not directly represented by specific event record(s) 112 from computing device 104.

Different devices or types of computing devices 104, 118 can have different needs or ways of interacting with cluster 106. For example, cluster 106 can interact with discrete request/response communications to computing devices 104 to determine additional data. Additionally or alternatively, computing devices 104 can be data sources (e.g., running security agents) and can interact with cluster 106 with discrete or ongoing transmissions of event records to be handled. For example, a data source in a personal computing device 104(1) can provide to cluster 106 data of events such as file installations, process launches, or writes to system files. Additionally or alternatively, computing devices 104 can be data sinks and can interact with cluster 106 with discrete or ongoing requests for data output from CMs 114, e.g., updates to blacklists or other security-relevant information.

Computing device(s) 102 can store one or more CM(s) 114, individually or collectively referred to herein with reference 114. In some examples, algorithms for determining or operating CM(s) 114 as described herein can be performed on computing device(s) 102. The resulting models can be used on such computing devices or on computing devices (e.g., computing device 104) having one or more input devices, such as a physical keyboard, a soft keyboard, a touch screen, a touch pad, microphone(s), or camera(s). In some examples, functions described herein can be shared between one or more computing device(s) 102 and one or more computing device(s) 104. For example, the computing device(s) 102 can determine a CM 114 initially and the computing device(s) 104 can perform incremental updating of the CM 114.

In various examples, e.g., of CM(s) 114 for classifying events or other use cases noted herein, the CM(s) 114 may include, but are not limited to, multilayer perceptrons (MLPs), neural networks (NNs), gradient-boosted NNs, convolutional NNs (CNNs), deep neural networks (DNNs) (i.e., neural networks having at least one hidden layer between an input layer and an output layer), recurrent neural networks (RNNs) such as long short-term memory (LSTM) networks or Gated Recurrent Unit (GRU) networks, decision trees such as Classification and Regression Trees (CART), boosted trees or tree ensembles such as those used by the "xgboost" library, decision forests, autoencoders (e.g., denoising autoencoders such as stacked denoising autoencoders), Bayesian networks, support vector machines (SVMs), or hidden Markov models (HMMs). In some examples of DNNs, the hidden layer has fewer neurons than the input layer does, and the hidden layer has fewer neurons than the output layer does. In these examples, the hidden layer is an example of a chokepoint layer. In some examples, the DNN includes more than one hidden layer. The CMs 114 can additionally or alternatively include regression models, e.g., linear or nonlinear regression using mean squared deviation (MSD) or median absolute deviation (MAD) to determine fitting error during the regression; linear least squares or ordinary least squares (OLS); fitting using generalized linear models (GLM); hierarchical regression; Bayesian regression; or nonparametric regression.

The CMs 114 can include parameters governing or affecting the output of the CM 114 for a particular input. Parameters can include, but are not limited to, e.g., per-neuron, per-input weight or bias values, activation-function selections, neuron weights, edge weights, tree-node weights, or other data values. A training module 228, FIG. 2, can be configured to determine CMs 114, e.g., to determine values of parameters in CMs 114. For example, CMs 114 can be determined using an iterative update rule such as gradient descent (e.g., stochastic gradient descent or AdaGrad) with backpropagation.

In some examples, the training module 228 can determine the CMs 114 based at least in part on "hyperparameters," values governing the training. Example hyperparameters can include learning rate(s), momentum factor(s), minibatch size, maximum tree depth, maximum number of trees, regularization parameters, dropout, class weighting, or convergence criteria. In some examples, the training module 228 can determine the CMs 114 in an iterative technique or routine involving updating and validation. The training data set can be used to update the CMs 114, and the validation data set can be used in determining (1) whether the updated CMs 114 meet training criteria or (2) how the next update to the CMs 114 should be performed. Examples are discussed herein, e.g., with reference to at least FIG. 6, 7, or 10.

The computing device(s) 102 can be configured to use the determined parameter values of trained CM(s) 114 to, e.g., categorize an event or event sequence with respect to association with malware or with a targeted attack, or to perform other data analysis or processing. In some examples, the computing device 104 can be configured to communicate with computing device(s) 102 to operate a CM 114. For example, the computing device 104 can transmit a request to computing device(s) 102 for an output of the CM(s) 114, receive a response, and take action based on that response. For example, the computing device 104 can provide to entity 110 information included in the response, or can quarantine or delete file(s) indicated in the response as being associated with malware. In some examples, computing device 104 can transmit event record(s) 112 to cluster 106, and cluster 106 can push notifications of classification(s) 116 to computing device 104 in response to a determination that an event is associated with a security violation.

Throughout this document, a "feature vector" is a collection of values associated with respective axes in a feature space. Accordingly, a feature vector defines a point in feature space when the tail of the feature vector is placed at the origin of the M-dimensional feature space. Feature vectors can often be represented as mathematical vectors of, e.g., scalar or vector values, but this is not required. The feature space can have any number M of dimensions, M≥1. In some examples, features can be determined by a feature extractor, such as a previously-trained CM or a hand-coded feature extractor. The term "feature vector" permits any particular element of a feature vector to be the output of a computation determined through feature engineering, but does not require that. For example, features can be hidden-neuron outputs of a word-proximity model such as word2vec (or other "x2vec" models), e.g., as discussed below with reference to FIGS. 6 and 7.

In some examples example, the classification 116 includes a rational or real number (e.g., in floating- or fixed-point representation), a bitmask, an attribute list, a softmax output, or another representation of categories to which the event represented by or associated with an event record 112 belongs, as determined by CM(s) 114. For example, classification(s) 116 or result record(s) 124 can include Boolean value(s) indicating whether or not corresponding event(s) are associated with security violation(s). Additionally or alternatively, classification(s) 116 or result record(s) 124 can include enumerated value(s) indicating with which of several categories the analyzed event(s) are associated (e.g., "benign," "virus," or "spyware"). Classification 116 can additionally or alternatively include one or more confidence values or other values indicating the likelihood of a classification, e.g., a "spyware" value of 0.42 indicating a 42% likelihood that the event is, e.g., an attempt to install spyware. In an example, classification 116 can include multiple confidence values for respective categories of malware (e.g., "spyware=0.42; worm=0.05").

An event (or sequence of events, or composite event, and likewise throughout this document) can be associated with a security violation (e.g., an intrusion or other malicious behavior) if, e.g., the event was produced by malicious code (e.g., malware) or at least a portion of a grouping of malicious code (e.g., a benign file modified by a file infector virus); the event was triggered by a generator commonly used for generating malware (e.g., a packer or installer); or the event relates to creation or use of an input file relied on by malware (e.g., a large sequence of data designed to trigger a buffer overflow that will permit remote code execution, or shellcode embedded in a document file). Examples of security violations or activity associated therewith can include: the specific exploitation of a vulnerability (e.g., to gain the ability to execute code on a computing device 104 or to elevate privileges on the computing device 104); the use by an adversary of stolen credentials to run commands via an administrative protocol such as Windows Management Instrumentation, WMI, or other exploitation of user credentials and remote-access or system-management protocols or tools to gain unauthorized access to a computing device 104.

In an example of generators, a data stream may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with a security violation, and events related to the decruncher may be indicated as such by the classification 116. Malicious code, generators, shellcode, and other data streams described in this paragraph are referred to for brevity as "associated with malware."

In some examples, malware comprises malicious data instead of or in addition to malicious code. Such data is also considered to be associated with malware, and events triggered by or otherwise related to such data can be considered to be associated with security violations. For example, some programs may have bugs that prevent them from correctly processing certain inputs. Examples include Structured Query Language (SQL) injection attacks, in which a program populates a query with unescaped external data. For example, the query template "SELECT cost from Products WHERE name LIKE '%{$name}%';" can be abused by providing malicious data to be populated in place of the placeholder "{$name}". When the malicious data $name="foo'; DROP TABLE Products; —" is substituted into the query template, for example, the resulting query will cause the "Products" table of the database to be deleted ("dropped"), causing unexpected loss of data.

In another example, malicious data can include malformed UTF-8 (Unicode Transformation Format-8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with malware.

For generators and other examples or use cases described herein, a determination that an event is associated with a security violation does not necessarily require or guarantee that the event indeed be triggered by malware or a targeted attack, or that any data stream related to the event in fact be associated with malware. For example, some generators and input streams are used for malware, and are also used for legitimate software. In some examples, classification 116 can be used by a security analyst (e.g., entity 120) in triaging events, and can permit the security analyst to readily separate events based on a likelihood they are in fact associated with malware or targeted attacks. In some examples, a computer-security system can delete or quarantine files associated with security violations, or terminate processes launched from data streams associated with malware or represented in events associated with security violations.

For brevity, events or other security-relevant data are described herein as "associated with a security violation" (or "computer-security violation") if those events or other data are at least one of: associated with malware; associated with or performed by an APT adversary; performed or generated while conducting, preparing to conduct, or attempting to conduct malicious activities; or otherwise performed or generated while attempting to gain or use, or gaining or using, unauthorized access to a computing system or network. Paras. [0043]-[0047] give various examples of events associated with security violations.

Except as expressly indicated otherwise, a determination of whether a data stream or event is associated with malware or with a security violation is carried out programmatically by or using CM(s) 114 according to techniques herein. Various examples herein can be performed without human judgment of whether an event or data stream is in fact malicious. Using CM(s) 114 can permit more readily identifying potential computational threats, e.g., in the context of an antivirus program, cloud security service, or on-premises security appliance, more readily than in some prior schemes.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out computational-model determination or operation as described herein, e.g., for file-analysis or malware-detection purposes.

In some examples, computing devices 102(1)-102(N) in cluster 106 can, e.g., share resources, balance load, increase performance, or provide fail-over support or redundancy. Computing devices 104 can additionally or alternatively operate in a cluster or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, or network connectivity are provided (for example, through a rental agreement) over a network, such as the Internet. As used herein, the term "computing" used with reference to computing clusters, nodes, and jobs refers generally to computation, data manipulation, or other programmatically-controlled operations. The term "resource" used with reference to clusters, nodes, and jobs refers generally to any commodity or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space or mounting/unmounting services, electrical power, etc. Cloud resources can be provided for internal use within an organization or for sale to outside customers. In some examples, computer security service providers can operate cluster 106, or can operate or subscribe to a cloud service providing computing resources.

In other examples, cluster 106 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

Network(s) 108 can include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX.

As noted above, network(s) 108 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Different networks have different characteristics, e.g., bandwidth or latency, and for wireless networks, accessibility (open, announced but secured, or not announced), or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations

Figure 2:
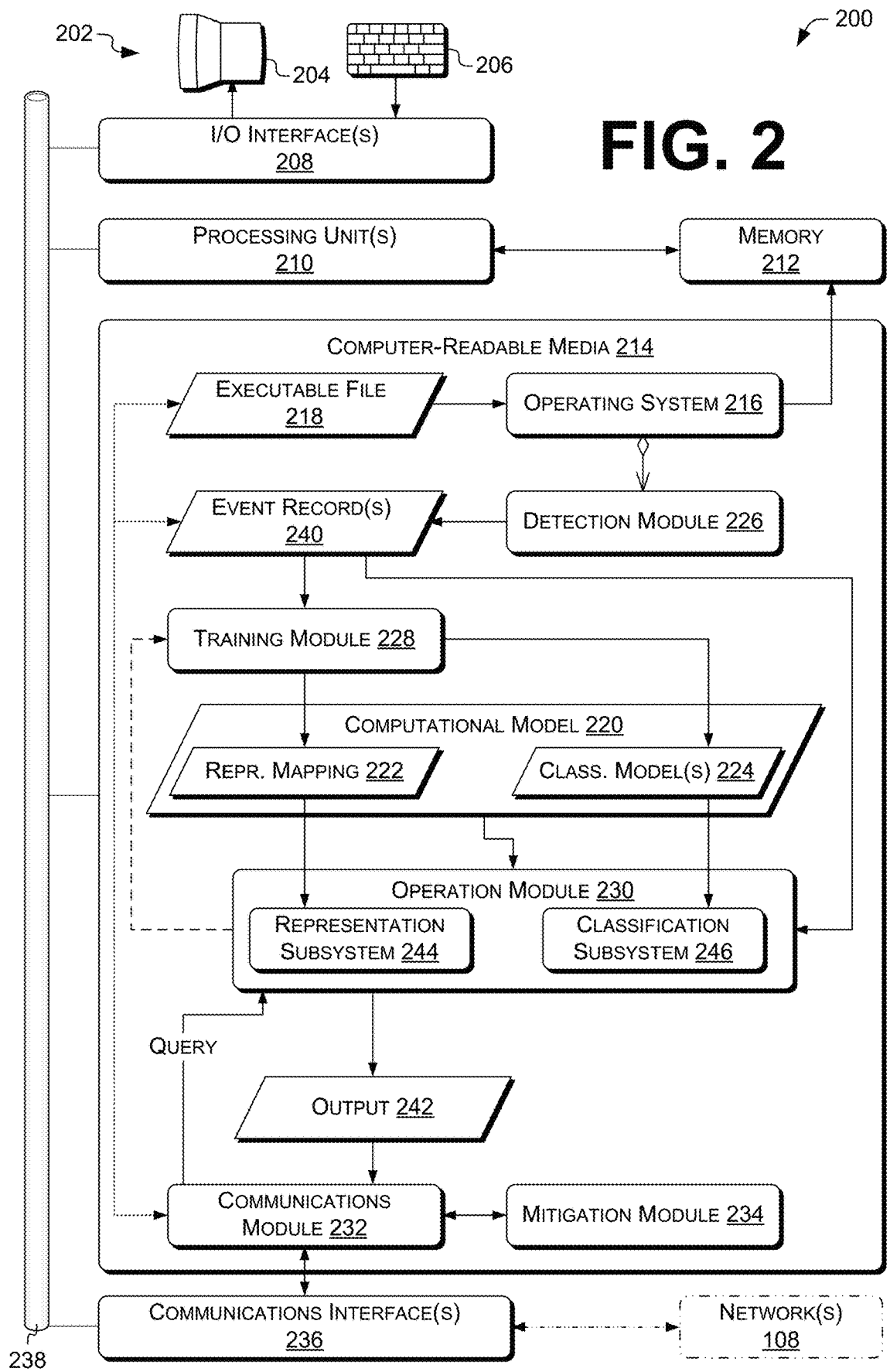
FIG. 2 is a block diagram depicting an example computing device configured to participate in determining or operating computational model(s), or performing mitigation, according to various examples described herein.

FIG. 2 is an illustrative diagram that shows example components of a computing device 200, which can represent computing device(s) 102 or 104, and which can be or implement a computational-model determination or operation system, device, or apparatus, according to various examples described herein. Computing device 200 can include or be included in a system or device for determining or operating a computational model as described herein. In some examples, computing device 200 can be or include at least a portion of a computer-security system.

Computing device 200 can include or be connected to a user interface 202. In some examples, user interface 202 can be configured to permit a user, e.g., entity 110, 120 or a computational-model (CM) administrator, to operate the CM(s) 114, or to control or otherwise interact with cluster 106 or computing devices 102 therein. Accordingly, actions such as presenting information of or corresponding to an output of a CM 114 to entity 110 can be taken via user interface 202.

In some examples, user interface 202 can include various types of output devices configured for communication to a user or to another computing device 200. Output devices can be integral or peripheral to computing device 200. Examples of output devices can include a display 204, a printer, audio speakers, beepers, or other audio output devices, a vibration motor, linear vibrator, or other haptic output device, and the like. Display 204 can include an organic light-emitting-diode (OLED) display, a liquid-crystal display (LCD), a cathode-ray tube (CRT), or another type of visual display. Display 204 can be a component of a touchscreen, or can include a touchscreen.

User interface 202 can include a user-operable input device 206 (depicted as a gamepad). User-operable input device 206 can include one or more input devices, integral or peripheral to computing device 200. The input devices can be user-operable, or can be configured for input from other computing device 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like. User queries can be received, e.g., from entity 110, via user interface 202.

Computing device 200 can further include one or more input/output (I/O) interface(s) 208 to allow computing device 200 to communicate with input, output, or I/O devices (for clarity, some not depicted). Examples of such devices can include components of user interface 202 such as user-operable input devices and output devices described above. Other examples of such devices can include power meters, accelerometers, and other devices for measuring properties of entity 110, computing device 200, or another computing device 102 or 104. Computing device 200 can communicate via I/O interface 208 with suitable devices or using suitable electronic/software interaction techniques. Input data, e.g., of user inputs on user-operable input device 206, can be received via I/O interface 208 (e.g., one or more I/O interface(s)). Output data, e.g., of user interface screens, can be provided via I/O interface 208 to display 204, e.g., for viewing by a user.

The computing device 200 can include one or more processing unit(s) 210. In some examples, processing unit(s) 210 can include or be connected to a memory 212, e.g., a RAM or cache. Processing units 210 can be operably coupled to the I/O interface 208 and to at least one computer-readable media 214 (CRM), e.g., a tangible non-transitory computer-readable medium.

Processing unit(s) 210 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA or XILINX that includes a CPU core embedded in an FPGA fabric. These or other hardware logic components can operate independently or, in some instances, can be driven by a CPU. In some examples, at least some of computing device(s) 102 or 104, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), or hardware logic device, can be incorporated in computing device 200, while in some examples at least one processing unit 210, e.g., one or more of a CPU, GPU, or hardware logic device, can be external to computing device 200.

Computer-readable media described herein, e.g., CRM 214, includes computer storage media or communication media. Computer storage media includes tangible storage units such as volatile memory, nonvolatile memory, or other persistent, non-transitory, or auxiliary computer storage media, removable and non-removable computer storage media implemented in any technique or technology for storage of information such as computer-readable or -executable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 200.

In contrast to computer storage media, communication media can embody computer-readable or -executable instructions, data structures, program modules, or other data in a modulated data signal, such as a carrier wave, or other transmission mechanism. As defined herein, computer storage media does not include communication media.

In some examples, CRM 214 can store instructions executable by the processing unit(s) 210, or instructions executable by external processing units such as by an external central processing unit (CPU) or external processor of any type discussed herein. Any of these instructions are referred to herein as computer-executable instructions or processor-executable instructions. For example, CRM 214 can store instructions of an operating system 216. CRM 214 can additionally or alternatively store at least one executable file 218, e.g., a user program or system-service executable, or another system component. In some examples, operating system 216 can cause processing unit(s) 210 to load the computer-executable instructions from executable file 218 into a RAM or other high-speed memory, e.g., memory 212, or to otherwise prepare computer-executable instructions from executable file 218 for execution by processing unit(s) 210. Some examples, e.g., bare-metal embedded-systems configurations, can include a loader but not an operating system 216. Examples herein are discussed with reference to executable file 218 and can additionally or alternatively be used for other types of files, e.g., data files.

In some examples, a "control unit" as described herein includes processing unit(s) 210. A control unit can also include, if required, memory 212, CRM 214, or portions of either or both of those. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing computer-executable instructions.

Computer-executable instructions or other data stored on CRM 214 can include at least one computational model (CM) 220, which can represent CM(s) 114, FIG. 1. CM 220 can be stored as data (e.g., parameters); as code (e.g., for testing branch points in a decision tree); or as a combination of data and code. CM 220 can include a representation mapping 222 and one or more classification computational model(s) 224 (individually or collectively referred to herein with reference 224). The representation mapping 222 can include a computational model, e.g., a neural network. Additionally or alternatively, the representation mapping 222 can include a lookup table, e.g., determined based at least in part on (e.g., extracted from) a trained computational model. The classification CM(s) 224 can include one or more Computer-executable instructions or other data stored on CRM 214 can include instructions of the operating system 216, a detection module 226, a training module 228, an operation module 230, a communications module 232, a mitigation module 234, or other modules, programs, or applications that are loadable and executable by processing unit(s) 210. Processing unit(s) 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 or 104 to perform operations described herein with reference to the operating system 216 or the above-listed modules 228-234.

In some examples not shown, one or more of the processing unit(s) 210 in one of the computing device(s) 102 or 104 can be operably connected to CRM 214 in a different one of the computing device(s) 102 or 104, e.g., via communications interface 236 (discussed below) and network 108. For example, program code to perform steps of flow diagrams herein, e.g., as described herein with reference to modules 228-234, can be downloaded from a server, e.g., computing device 102(1), to a client, e.g., computing device 104(K), e.g., via the network 108, and executed by one or more processing unit(s) 210 in computing device 104(K).

The computing device 200 can also include a communications interface 236, which can include a transceiver or other network-interface device such as a network interface controller (NIC) to send and receive communications over a network 108 (shown in phantom), e.g., as discussed above. As such, the computing device 200 can have network capabilities. Communications interface 236 can include any number of network, bus, memory, or register-file interfaces, in any combination, whether packaged together or separately. In some examples, communications interface 236 can include a memory bus internal to a particular computing device 102 or 104, transmitting or providing data via communications interface 236 can include storing the data in memory 212 or CRM 214, and receiving via communications interface 236 can include retrieving data from memory 212 or CRM 214. In some examples, communications interface 236 can include a datapath providing a connection to a register file within a processor. For example, a first software module can load parameters into the register file via the datapath, and then and issue a function call to a second software module. The second software module can retrieve the parameters from the register file and return a result via the register file.

In some examples, the communications interface 236 can include, but is not limited to, a transceiver for cellular (3G, 4G, or other), WI-FI, Ultra-wideband (UWB), BLUETOOTH, or satellite transmissions. The communications interface 236 can include a wired I/O interface, such as an Ethernet interface, a serial interface, a Universal Serial Bus (USB) interface, an INFINIBAND interface, or other wired interfaces. The communications interface 236 can additionally or alternatively include at least one user-interface device or user interface, at least one bus such as a memory bus, datapath, or local bus, at least one memory interface, or at least one hardwired interface such as a 0-20 mA control line.

In some examples, the operating system 216 can include components that enable or direct the computing device 200 to receive data via various inputs (e.g., user controls such as user-operable input device 206, network or communications interfaces such as communications interface 236, devices implementing memory 212, or sensors), and process the data using the processing unit(s) 210 to generate output. For example, the communications module 232 and communications interface(s) 236 can receive event data representing an event associated with a monitored computing device 104, e.g., as discussed herein with reference to event record 112, 810 or event data 504, 904. The operating system 216 can further include one or more components that present the output (e.g., display an image on an electronic display 204, store data in memory 212, or transmit data to another computing device 102 or 104. The operating system 216 can enable a user (e.g., entity 110) to interact with the computing device 200 using a user interface 202. Additionally, the operating system 216 can include components that perform various functions generally associated with an operating system, e.g., storage management and internal-device management.

In some examples, the processing unit(s) 210 can access the module(s) on the CRM 214 via a bus 238. I/O interface 208 and communications interface 236 can also communicate with processing unit(s) 210 via bus 238. Bus 238 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses, or any combination thereof.

In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the training module 228 and the operation module 230 can be combined in a single module that performs at least some of the example functions described below of those modules, or likewise the communications module 232 with either the training module 228 or the operation module 230, the communications module 232 and the mitigation module 234, or the communications module 232 and the detection module 226. In some examples, CRM 214 can include a subset of the above-described modules.

In the illustrated example, the communications module 232 can receive event record(s) 240, as represented by the stippled arrows. In some examples, detection module 226 e.g., running at a monitored computing device 104, can detect activity at monitored computing device 104 and determine corresponding event record(s) 240. Examples of detection are discussed below. In some examples, communications module 232 can transmit event record(s) 240 determined by detection module 226, e.g., to cluster 106.

In the illustrated example, the training module 228 can determine at least part of the CM 220, e.g., the representation mapping 222 or the classification model 224. The representation mapping 222 or the classification model 224 can be determined, e.g., based at least in part on at least one training event record of the event record(s) 240, which can represent event record(s) 112. For example, the training module 228 can update parameters of a neural network, or rebuild or update a decision forest, based at least in part on event record(s) 240 or event data therein, e.g., command-line data. Examples are discussed herein, e.g., with reference to at least FIGS. 6, 7, and 11.

In the illustrated example, the operation module 230 can operate the CM 220 based at least in part on, e.g., at least one trial event record of the event record(s) 240, to provide an output 242. Output 242 can represent, e.g., classification 116 or another indication of whether an event is associated with malware. Examples are discussed herein, e.g., with reference to FIGS. 3-11.

Output 242 is shown as stored in CRM 214. Output 242 can additionally or alternatively be stored in memory 212 or another processor-accessible storage device, e.g., a transmit buffer of communications interface 236. In some examples, CM 220 can be configured to provide a classification 116 for any type of event. In other examples, CM 220 can be configured to provide a classification 116 for events known to be of a particular type. For example, separate CMs 220 can be determined and operated for malware-related events and for targeted-attack events.

In some examples, the training module 228 or the operation module 230 can operate the CM 220 based at least in part on training event record(s) 112 of a validation set to evaluate the performance of the CM 220. The CM 220, e.g., the representation mapping 222 or the classification CM 224, can then be updated based on the evaluation. The dashed arrow from operation module 230 to training module 228 depicts coordination between those modules. Alternatively, the evaluation and updating can both be performed by the training module 228.

In some examples, the communications module 232 can provide an indication of the output 242, e.g., via the communications interface 236. For example, the indication can be transmitted to a computing device 104, e.g., via network(s) 108. Examples are discussed herein, e.g., with reference to at least FIGS. 3-11. In some examples, communications module 232 can additionally or alternatively receive the executable file 218 (or another data stream) via the communications interface 236.

In the illustrated example, the mitigation module 234 can receive an indication that a data stream is associated with malware, or an indication of a mitigation action to take. The indication can be, e.g., output 242. The mitigation module 234 can then take action to reduce negative effects the dirty data stream may cause. For example, the mitigation module 234 can terminate process(es), delete or quarantine file(s), or trigger a reboot. In some examples, mitigation module 234 can be included in or associated with operating system 216. For example, mitigation module 234 can run at ring zero (on x86 processors) or another high-privilege execution level.

In some examples, the operation module 230, the communications module 232, or another module stored in CRM 214 can be configured to receive inputs, e.g., via user-operable input device 206 or from a filesystem, transmit corresponding queries to a computing device 102, receive responses from computing device 102, and present the responses, e.g., via display 204. In some examples, determination and operation of CMs are carried out on computing device(s) 102. In some examples, determination and operation are carried out on a computing device 104. In some examples, a computing device 102 executes modules 228, 230, and 232, and a computing device 104 executes modules 232 and 234. In some examples, one or more computing device(s) execute module 228, and one or more different computing device(s) execute module 230.

In some examples, any of the above-noted modules can be configured to receive inputs and to determine or operate CM(s) 114 using instructions of operation module 230 based at least in part on those inputs, e.g., to determine a model output 242. In some examples, computer-executable instructions on CRM 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

In some examples, computing device 200 includes a representation subsystem 244 and a classification subsystem 246. In other examples, computing device 200 excludes one or both of subsystems 244, 246. In the illustrated example, subsystems 244, 246 are shown as components of operation module 230. In some other examples, some functions of training module 228 or other modules described herein are included in at least one of subsystems 244, 246. In some examples, representation subsystem 244 performs functions such as those described herein with reference to 3, 4, 7, or 8. For example, representation subsystem 244 can be configured to determine at least two term representations based at least in part on command-line text associated with an event using the representation mapping 222. In some examples, classification subsystem 246 performs functions such as those described herein with reference to FIG. 3-6 or 8-11. For example, classification subsystem 246 can be configured to determine an indication of whether the event is associated with a computer-security violation at least partly by providing the at least two term representations as input to the classification model 224.

In some examples, a computer-security system includes computing device(s) 200 representing computing device(s) 102 and other computing device(s) 200 representing monitored computing device(s) 104. Detection module 226 can be, include, or be part of a security agent executable on the monitored computing device and configured to send at least some of the event data via a network interface to a network interface of computing device(s) 102. In some examples, computing device(s) 102 can add data to an event or trigger additional event(s) based on the event data received from monitored computing device(s) 104.

In the illustrated example, detection module 226 (e.g., a security agent running on computing device 104) can detect events and provide corresponding event records 240. Additionally or alternatively, communications module 232 (e.g., running on a computing device 102) can receive event records 240 describing events. In some examples, communications module 232 can receive queries 122 for processing by operation module 230. Communications module 232 can provide to a computing device 118 or other query-originating device(s) the result record(s) 124, e.g., including or representing output(s) 242.

In some examples, event records 240, queries 122, result records 124, or other transmissions described herein can be conducted, e.g., in the form of HTTP requests transmitted via TCP connections. For example, an HTTP request conveying a record, e.g., in a body of the request, can also include a URL parameter, HTTP cookie, or other data carrying identifying information or credentials associated with the record. Result records 124 and other transmissions herein can be conducted in an HTTP response header or body, or other response to a request or unprompted transmission.

In some examples, detection module 226 can include a kernel-level security agent (e.g., part of OS 216, as shown) or a user-level security agent. In various embodiments, the kernel-level security agent can be installed on the host computing device in the form of a driver. For example, a driver or other implementation of detection module 226 can use hooks or filter drivers, or monitor memory or log files, as discussed below.

In some examples, the kernel-level security agent can operate on computing device 104 as a virtual machine/shadow operating system. The kernel-level security agent can load before the operating system 216 of the host computing device, e.g., very early in the boot-time of the host computing device, by some of the first few dozen instructions in some examples. Pre-boot components of detection module 226 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, the detection module 226 can be received from or operable with a security service. Such a security service may be implemented as a cloud of security service devices, e.g., cluster 106, referred to herein as a "security service cloud" or a "remote security system." The security service cloud can, e.g., install the detection module 226 on the computing device 104; receive event records 240 or other notifications of observed events from the detection module 226; perform analysis of data associated with those events; perform, direct, or trigger mitigation actions at computing device(s) 104; or generate configuration updates and provide those updates to the detection module 226. These or other interactions between the kernel-level security agent and the security service cloud can enable a detection loop that defeats the malware update loop of adversaries, such as malware developers.

In some examples, detection module 226 can include various components, e.g., various software modules. Components can include collectors, filters, routers/dispatchers, or event consumers. Collectors can receive notifications of events (e.g., file writes and launching executables) from host operating system hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record 240 including the forensic data.

In various embodiments, a collector may register with a hook or filter driver offered by the operating system 216 to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 226. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 226 may include user mode collectors to observe events that may not be visible to kernel mode processes. Such events could include, for example, rendering of display graphics for display on a display screen of the computing device 104. To observe these events, the detection module 226 is further configured to load user mode collectors as user-mode modules of the computing device 104. Like the kernel-mode collectors described above, user mode collectors may observe multiple kinds of events or activities, or each kind may be associated with a different user mode collector. The events observed by the user mode collectors may be specified by a configuration of the detection module 226. In some embodiments, the user mode collectors observe all user mode events on the computing device 104 and the configuration specifies configurable filters for filtering and dispatching the events. In other embodiments, the configuration specifies which user mode collectors should be loaded to observe specific types of events. In yet other embodiments, the configuration both specifies which user mode collectors should be loaded and configurable filters for filtering and dispatching those events.

In some examples, the detection module 226 (e.g., running at a monitored computing device 104 or in cluster 106) can build and maintain a model representing chains of execution activities and genealogies of processes. This model can be used to track attributes, behaviors, or patterns of processes executing on the computing device 104 and can enable an event consumer to determine when an event should be reported to the operation module 230 for evaluation. Upon determining an occurrence of such an event, the event consumer can perform any or all of: updating the situational model and performing further observation; generating an event record 240 to represent the determination that an event has occurred; notifying the security service cloud of the event (e.g., by transmitting event record 240 to the security service cloud, e.g., in cluster 106); or performing, directing, or triggering mitigation actions at computing device 104 (e.g., halting execution of a process associated with a security violation). In various embodiments, any or all of the observing, filtering, routing/dispatching, or utilizing of event consumers may occur in parallel with respect to multiple events.

In some examples that detect events based on chains of execution activities of the host computing device and other data described herein, rather than on fixed signatures, the kernel-level security agent is able to effectively detect processes associated with malicious code. While adversaries can easily change malware to avoid signature-based detection, it is significantly more difficult to avoid detection by an agent (e.g., detection module 226) that monitors and analyzes events. Cluster 106 (e.g., operation module 230 thereof) can process events from multiple computing devices 104 to detect more complex patterns of malicious activity.

Illustrative Techniques

Figure 3:
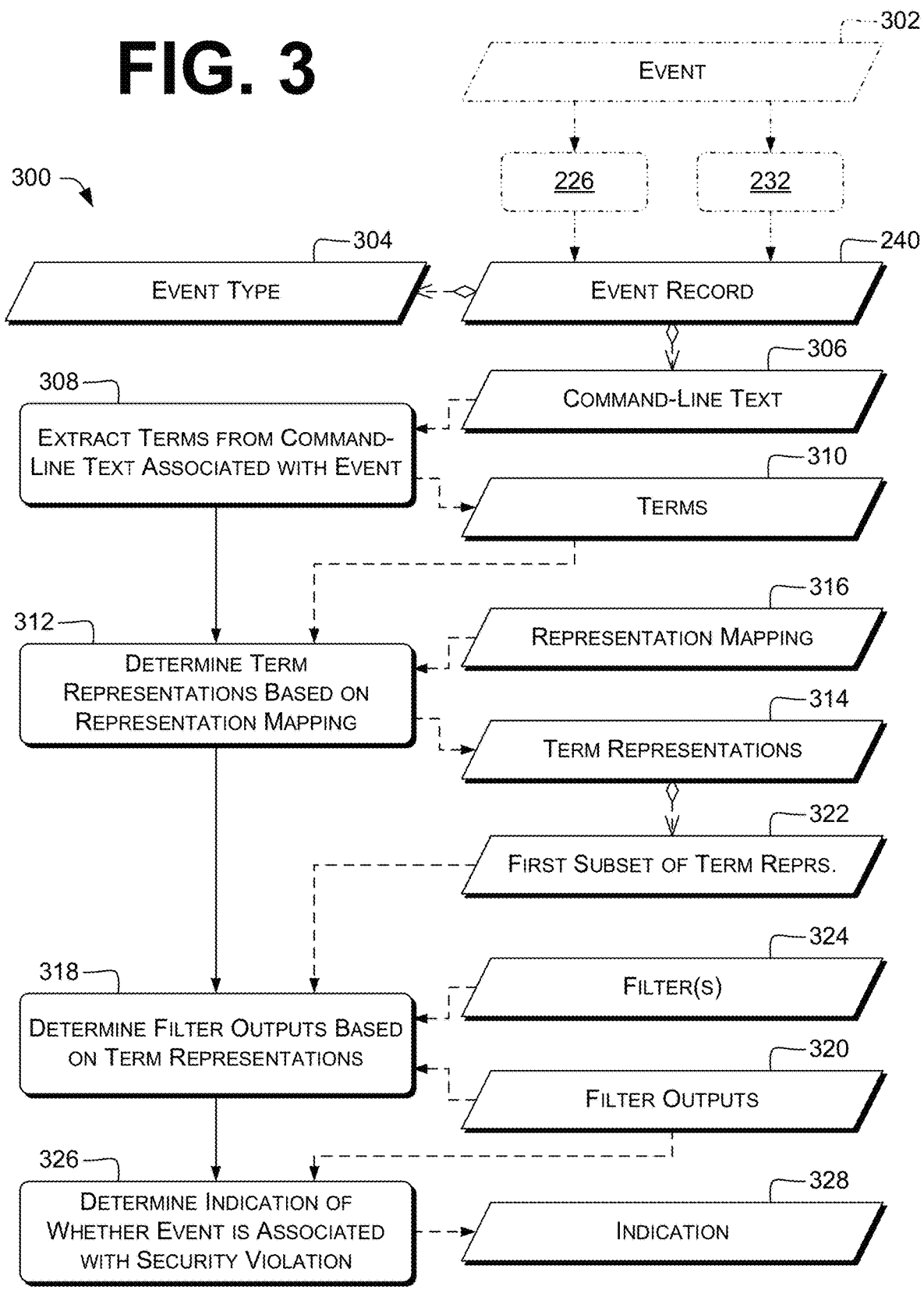
FIG. 3 is a dataflow diagram that illustrates example techniques for operating computational model(s), e.g., to determine whether an event is associated with a security violation.

FIG. 3 is a dataflow diagram that illustrates an example technique 300 for determining an indication of whether an event is associated with a security violation, e.g., by operating computational model(s), and related dataflow (shown dashed for clarity). Example functions shown in FIG. 3 and other flow diagrams and example techniques herein can be implemented on or otherwise embodied in one or more computing device(s) 102 or 104, e.g., a computing device 200, e.g., using software running on such device(s), e.g., software executed by processing unit(s) 210. For the sake of illustration, the example technique 300 is described below with reference to processing unit 210 and other components shown in FIGS. 1 and 2 that can carry out or participate in the steps of the example technique (e.g., a control unit), and with reference to data structures shown in FIGS. 1 and 2. However, other processing unit(s) such as processing unit(s) 210 or other components of computing device(s) 102 or 104 can carry out step(s) of described example techniques such as technique 300. Similarly, example technique(s) shown in FIGS. 4-11 are also not limited to being carried out by any specifically-identified components.

In software embodiments, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

The order in which the operations are described in each example flow diagram or technique is not intended to be construed as a limitation, and any number of the described operations can be combined in any order or in parallel to implement each technique. In each flow diagram, fewer than all of the depicted operations can be performed, except as expressly noted. Moreover, the operations in each of FIGS. 3-11 can be implemented in hardware, software, or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

For clarity of explanation, the operations of FIG. 3 are described in terms of batch processing. However, this is not limiting, and the operations of FIG. 3 (or FIGS. 4-11) can be performed in a streamed or pipelined manner, or any combination of batch, stream, and pipelined processing.

In some examples, detection module 226 running on a computing device 102 or 104 detects an event 302 associated with a monitored computing device 104. In some examples, the event 302 is associated with a process that has an ancestor process, e.g., a parent, grandparent, &c. Detection module 226 produces an event record 240 including event data describing the event 302. In some other examples, communications module 232 receives the event record 112.

For example, the event record 112 can include an event type 304 of the event 302. Event types 304 are described herein for clarity using natural language, but can be identified in at least some software or hardware implementations using enumerated values, abbreviated text strings (e.g., reverse domain names), or other forms. Nonlimiting example event types 304 can include, e.g., "process created," "file opened" "network connection established," or "DNS request made." In some examples, events 302 of these types are detected by computing device 104. Further nonlimiting example event types 304 can include "grandchild process spawned," "signature match," or other event types 304 of events 302 detected based on information collected over time or supplemental information (e.g., an antivirus database) used in addition to sub-event data from computing device 104. In some examples, events 302 of these event types 304 are detected by computing device(s) 102.

In some examples, monitored computing device 104 sends event records 112 to cluster 106 representing process-launch sub-events. A process-launch sub-event event record 112 includes the command line of the launched process, a process ID (PID) of the launched process, and a process ID (PPID) of the parent of the launched process. Cluster 106 uses the PID and PPID to record relationships between processes. Cluster 106 can receive a process-launch sub-event and determine the number of processes in the chain beginning with the launched process and ending with the root process (e.g., init(8), the System process, PID 4, on a WINDOWS system, smss.exe, dwm.exe, wininit.exe, or winlogon.exe) running on the monitored computing device 104. If the number is ≥3 (e.g., a grandchild of the root process, or farther down) (or ≥k, for predetermined $k \in \mathbb{Z} > 1$), cluster 106 can trigger an event 302 for processing as described herein. That event can have an event type 304 of "process having parent and grandparent started" or similar.

Further example events 302 can include occurrence of at least one of the following, and can be indicated by corresponding event types 304.

Creating a process, for example, creating of a command line interface (CLI);

Creating a thread;

Creating a remote thread (i.e., creating a thread in another process), for example, dynamic-link library (DLL) injection or other thread injection, which is an action that can be used to escape one process and pivot to another process;

Creating a new script (e.g., batch file, shell script, VISUAL BASIC script, or POWERSHELL script);

Creating a new executable (e.g., creating a portable executable (PE));

Accessing another process and reading from its memory or writing to its memory;

Creating a service (e.g., a service can be used to start a process or to start a process every time system is rebooted);

Modifying a service binary (e.g., changing portable executable files on disk instead of writing them);

Writing a dump file;

Decreasing security of a registration key or industry key;

A suspicious raw disk read; or

Privilege escalation in some contexts (e.g., user account control requests for elevation).

The "creation" events discussed above may be examples of dropping code on a monitored computing device. The actions discussed above may only trigger events when certain objects commit them. For example, when an Internet browser plug-in thread is compromised, activities such as CLI creation, process migration, installation, or PE creation and execution may be indicative of compromise of the Internet browser plug-in thread by a security violation. Moreover, an identity of an object that originated an action itself may determine whether or not an action taken by the monitored computing device triggers an event. For example, some plugins and processes are more susceptible to vulnerabilities and are therefore used for security violations more often. Actions taken by, or regarding, those plugins or processes may therefore trigger events.

In some examples, detection module 226 provides, or communications module 232 receives, command-line text 306 associated with the event 302. The command-line text 306 can include at least two command lines associated with the event. For example, the command-line text 306 can include a first command line associated with the process with which event 302 is associated, and a second command line associated with the ancestor process of that process. Examples are discussed herein, e.g., with reference to FIG. 4.

In some examples, command-line text 306 is included in the event record 112 or other event data associated with the event 302. Command-line text 306 can therefore be an example of a field in an event record 112.

Throughout this document, an event record 112, or any other record described herein, can include one or more fields, each of which can have a name or other identifier, and each of which can include or be associated with one or more values. For example, event record 112 or other records herein can be represented as ASN.1-defined data structures, GOOGLE protobufs, JSON records, XML documents or subtrees, associative arrays, or other forms of tagged or key-value storage. Examples of fields can include, but are not limited to, timestamps, filenames, filehandles, userids (e.g., Windows SIDs), groupids, process identifiers, session identifiers (e.g., process command lines), command-line histories, universally unique identifiers (UUIDs), operating-system identifiers, e.g., from uname(1), permissions, access-control lists (ACLs), login types (e.g., with or without secure attention sequence), timestamps, blocks of data (e.g., headers or full contents of files or of regions of memory), hashes of data (e.g., of the blocks of data, such as file contents), IP or other network addresses (e.g., of computing device 104 or peers with which it is communicating or is attempting to communicate), network port numbers (e.g., local or remote), identifiers of detection module 226 (e.g., a version number), values from the registry, dotfiles, or other configuration data (e.g., crontab entries), call-stack entries, domain names (e.g., relative or fully-qualified, FQDN), names or other identifiers of mutexes, named pipes, or other inter-thread communication or inter-process communication (IPC) mechanisms, or counts (e.g., of VIRUSTOTAL dirty indications).

In some examples, field values associated with an event 302 indicating an action taken or attempted by a process can report the corresponding values before the action, after the action, or both (e.g., filename before or after a rename, or both). In some examples, field values can include the results of applying transform(s) to any of the above, e.g., to smash case or otherwise filter or preprocess the data. In some examples, an event record 112 can include information about a process that is currently running on the computing device 104, or that has previously run on the computing device 104. In some examples, an event record 112 can include information about at least one currently-running process and at least one related process (e.g., still running or already terminated), e.g., a parent process of the currently-running process.

In some examples, at least one event type 304 can be associated with an event 302 that only occurs when a specific operating system 216 is running on the computing device 104 (e.g., WINDOWS-only events or MAC OS X-only events). In some examples, at least one event type 304 can be associated with events 302 that occur on multiple operating systems 216 (e.g., events that can occur on any OS providing a POSIX-compliant API). In some examples, an event type 304 can indicate at least one of the following types of events 302: a user logging on or off, the detection module 226 starting up or shutting down, a process being created, a network name being looked up (e.g., via DNS), a network connection being initiated or established (e.g., IPv4 or IPv6), a value in an auto-start extensibility point (ASEP) being created or modified, an executable being created, modified, or deleted, a critical system file being modified, a file of a specific type or extension being created or updated (e.g., based on a database listing the specific type(s) or extension(s) to be monitored), a new scheduled task or daemon being registered or otherwise set up to execute at a future time or on a schedule, or a process making or attempting an access to a portion of a disk, memory, or other system resource not allocated to that process.

At 308, the representation subsystem 244 can extract at least two terms 310 from the command-line text 306. Some examples extract at least n terms, e.g., n=3, n=4, or n>4. Some examples "tokenize" the command-line text 306, e.g., determine the terms 310 or separate adjacent terms 310, using: a tokenizer, e.g., strtok(3), lex, or flex; one or more regular expressions; or a context-free or context-sensitive grammar (e.g., LL(k), LR(k), or LALR(k), k≥0). Some examples include extracting, from a first command line of the at least two command lines 306, a contiguous sequence of punctuation characters as a first term of the at least two terms 310. Some examples further include extracting, from the first command line, a contiguous sequence of non-punctuation characters as a second term of the at least two terms 310. For example, the command line 'cmd.exe/c "echo 31337"' can yield the terms 'cmd', 'exe', '\' 'c', '"', 'echo', '31337', and '"' (i.e., qw{cmd.exe/c "echo 31337"}).

In some examples, non-punctuation characters are those matching a predetermined regular expression (e.g., qr{[A-Za-z0-9]}, qr{\w}, or qr{[[:alnum:]]}), and punctuation characters are those not matching the predetermined regular expression. In some examples, a whitespace character (e.g., matching qr{\ s} or qr{[[:space:]]}) is neither a punctuation character nor a non-punctuation character. In some examples, whitespace is disregarded except that it separates adjacent terms 310. For example, terms can be sequences in the command-line text 306 matching qr{\w+|[^\w\s]+}.

In some examples, the at least two command lines associated with the event 302 can include command lines of first, second, and third processes. The first process can be a process that triggered the event 302. The second process can be a parent process of the first process. The third process can be a parent process of the second process. In some examples, the command-line text 306 comprises the concatenation of the first-, second-, and third-process command lines in a predetermined order (e.g., third-, then second-, then first-process, or vice versa, or any other order). For example, a remote-desktop host (third, grandparent process) may spawn a shell (second, parent process) (e.g., cmd, POWERSHELL, or sh), which in turn spawns a process (first process) selected by the user of remote-desktop services.

In some examples, terms 310 are extracted from each command line of the at least two command lines separately, e.g., by mapping a regex sequentially against each command line rather than once against the concatenation of command lines. In this way, a grandparent command line ending " . . . --oo" and a parent command line beginning "ps . . . " will not result in the term "oops" being included in the terms 310. Instead, the terms 310 in this example would include qw{--oo ps}.

In some examples, the terms 310 are stored in order of occurrence in the command-line text 306, or information about the relative order of the terms is otherwise retained. This can permit analyzing behavior over sequences of command lines or individual operations, which can permit more effectively determining whether an event is associated with a security violation. For example, the UNIX shell command line "rm -- -rf *", when executed, will only remove files in the current directory (including one named "-rf"). However, "rm -rf * --" (double hyphen at the end) will remove files in the current directory and all subdirectories. Retaining term-order information permits distinguishing these command-lines from each other.

In some examples, stemming is performed on the command-line text 306 before or after extracting terms. In some examples, stemming is not performed on the command-line text 306 before or after extracting terms. In some examples, stopwords are not extracted as terms 310. In some examples, no stopword test is applied. In some examples, neither stemming nor stopword-detection is used while extracting terms 310.

In some examples, terms 310 are determined for at least one command line instead of or in addition to for at least two command lines. For example, terms 310 can be extracted from only the first-process command line, or from only the first-process command line and the second-process command line.

At 312, the representation subsystem 244 can determine respective term representations 314 of the at least two terms 310 based at least in part on a trained representation mapping 316, which can represent representation mapping 222. For example, a word2vec model can be trained on a term corpus (e.g., corpus 704, FIG. 7) including representative terms (for example, qw{c:\/-\\<|>>> net find localhost}, among others), and the representation mapping 316 can be the weight matrix of the trained word2vec model. In some examples, the corpus includes ≥10,000 terms (or ≥20,000, ≥30,000, ≥40,000, or ≥50,000). In some examples, the corpus includes terms drawn from command-line text 306 of both clean and dirty events 302.

The representation mapping 316 can receive terms 310 as input, e.g., in the form text in the ASCII, CP437, UTF-8, or another encoding. The representation mapping 316 can provide the term representations 314 as output. In some examples, the representation mapping 316 is or includes a lookup table (LUT). In some examples, the representation mapping 316 is or includes a one-to-one mapping between terms 310 and term representations 316. In some examples, the representation mapping 316 outputs a predetermined "unknown-term" representation 314 for any term not included in the term corpus. In some examples, more than half of, >90% of, or all of, the term representations 314 stored in trained representation mapping 316 are determined computationally rather than being determined directly by human mental activity.

Figure 4:
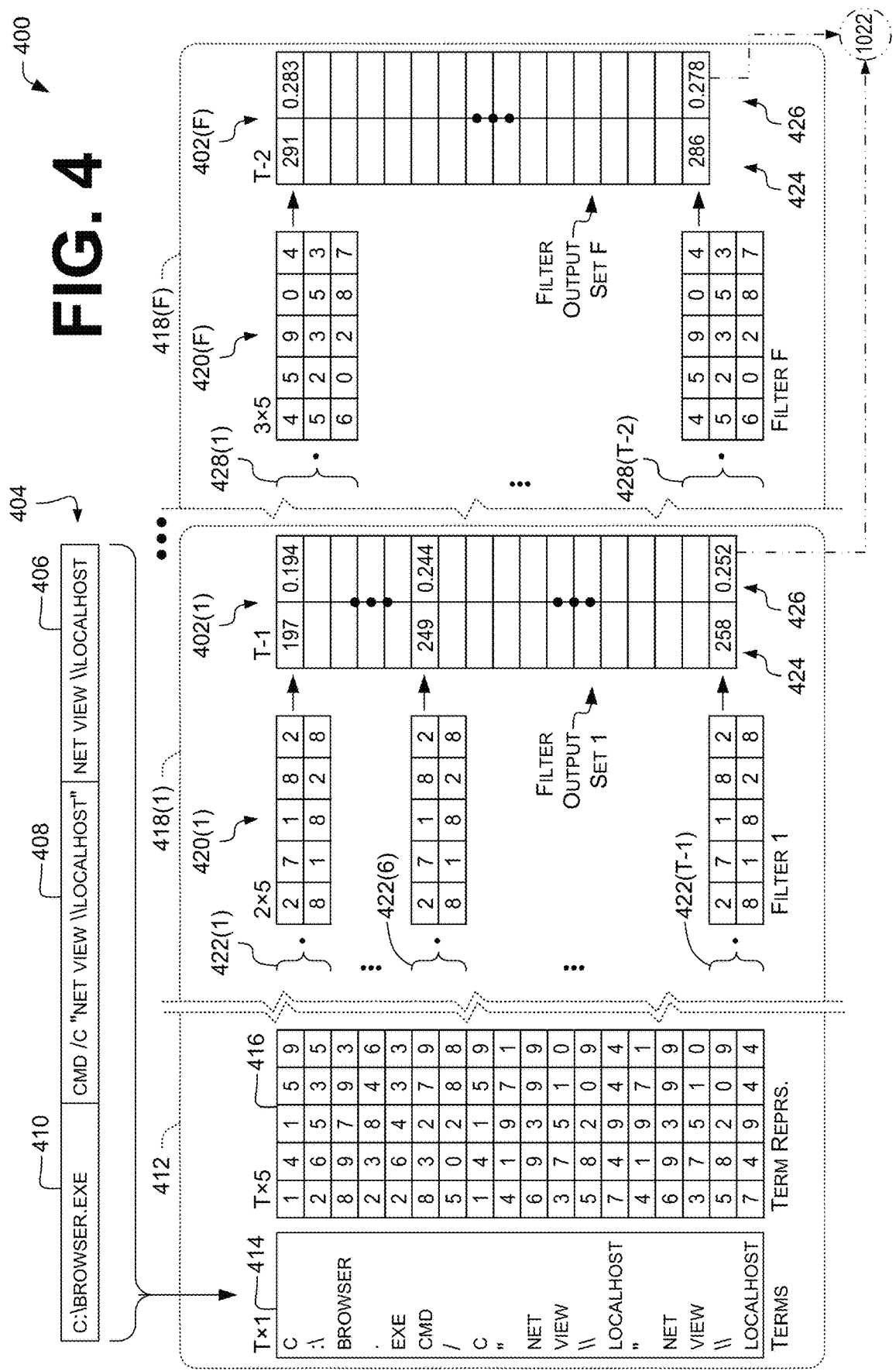
FIG. 4 illustrates example terms, term representations, filters, and filter outputs according to an example of determining whether an event is associated with a security violation.

At 318, the classification subsystem 246 can determine two or more first filter outputs 320, e.g., of first filter output set 402(1), FIG. 4. Each first filter output 320 can be determined based at least in part on the respective term representations 314 of terms 310 in a first subset 322 of the two or more terms 310. For example, the classification subsystem 246 can convolve the first subset 322 individually with a plurality of filters 324, and optionally apply weighting, biasing, or nonlinearity to provide the respective filter outputs 320. Examples are discussed herein, e.g., with reference to FIG. 4.

At 326, the classification subsystem 246 can determine an indication 328 of whether the event 302 is associated with a security violation at least partly by operating a trained classification CM 224 based at least in part on the two or more first filter outputs 320. For example, the classification subsystem 246 can apply the first filter outputs 320 as inputs to the trained classification CM 224. The trained classification CM 224 can output a binary or other categorical value indicating whether the event 302 is associated with a security violation. For example, the classification CM 224 can output the indication 328 as a one-hot or enumerated-value representation of a member of a set of possible classifications, e.g., qw<benign malware targeted-attack>. The representation of the member can indicate into which member of the set the event 302 has been classified.

In some examples, the trained classification CM 224 outputs probabilities associated with respective members of the set of possible classifications. The classification subsystem 246 can determine the indication 328 by, e.g., selecting the member of the set having the highest respective probability. In some examples, the classification subsystem 246 can additionally output the probabilities, e.g., to permit evaluating confidence levels of the classification.

FIG. 4 illustrates example techniques 400 for determining filter output sets 402(1)-402(F) (individually or collectively referred to herein with reference 402). Each filter output set 402 can represent one or more filter outputs 320. In the illustrated example, command-line text 404, which can represent command-line text 306, includes command line 406 of a first process, command line 408 of a second (e.g., parent) process, and command line 410 of a third (e.g., grandparent) process, as discussed above. In this hypothetical example, a Web browser is cracked and spawns a cmd.exe shell process, which an attacker uses to run a "net view" command to determine network-related information associated with the local computer ("\\localhost").

FIG. 4 shows two examples of filter-output computations using respective, different filters. In general, any number $F \in \mathbb{Z} \geq 1$ of filters can be can used to determine filter output sets 402(1)-402(F). In the illustrated example, section 412 shows an example of determining terms 414 and term representations 416. Section 418(1) shows an example of determining outputs of a first filter 420(1). Section 418(F) shows an example of determining outputs of a second filter 420(F). In some examples, such as those illustrated, each section 418($i$) takes as input term representations 416($i$) and computes a respective filter output set 402($i$) independently of any other section 418($i$). Sections 418 and filters 420 are individually or collectively referred to herein with references 418 and 420, respectively. In some examples, filters 420 are determined through computational-model training, e.g., as discussed herein with reference to FIGS. 6, 10, and 11. In some examples, filter output sets 420 are provided as inputs to pooling section 1022, FIG. 10 (shown in phantom). In other examples, filter output sets 420 are not provided as inputs to pooling section 1022.

Terms 414, which can represent terms 310, are extracted from command-line text 404. In this example terms 414 are items matching qr{\w+|[^\w\s]+} after joining command lines 406, 408, and 410 with whitespace between them. In this example, the number T of terms is 18. In the illustrated example, terms 414 have been extracted from three command lines 406, 408, 410. In other examples, terms 414 can be extracted from only one command line (e.g., command line 406, 408, or 410), or from two command lines (e.g., any two of the three shown). In various examples storing k command lines in command-line text 306, 404, terms 414 can be extracted from any number of command lines, 1-k, in any order. Some examples extract terms 414 from only the first-process command line 406 and the parent-process command line 408.

Term representations 416, which can represent term representations 314, are shown for brevity, without limitation, as five-element vectors listed horizontally. Each term 414 has the same representation anywhere it occurs. For example, term 'C' is represented by the vector [1, 4, 1, 5, 9], and term ':\' is represented by the vector [2, 6, 5, 3, 5]. In some examples, term representations 314 include 300-element vectors, e.g., output from a LUT determined using word2vec. Additionally or alternatively, term representations 314 can include vectors of 150, 500, or 800 elements each. The size of the vectors can be determined empirically, e.g., during training of computational model(s) 200, based on, e.g., performance of the computational model(s) 220 on a validation dataset.

In some examples, the number T of terms 414 and term representations 416 is set to a predetermined value, e.g., 300 or 900. In some of these examples, if the command-line text 404 has Φ terms for Φ∈ℤ <T, the term representations 416(Φ+1) through 416(T), which do not have associated terms 414, can be filled in with a predetermined "data-missing" indicator, e.g., an all-zero vector. Setting the number of terms to a predetermined value can permit using fixed-size neural networks to process command-lines of various lengths. In some examples, if the command-line text 404 is longer than T terms, only the first T or last T terms from command-line text 404 are used. In some examples, the T terms are divided among the command lines 406, 408, 410, e.g., as t=⌊T/3⌋. For example, with T=900, t=300 terms can be used for each command line 406-410. In some examples, if any command line 406-410 is longer than t terms, only the first t or last t terms from that command line 406-410 are used. In some examples, given command-line text including n command lines, substantially the first $n_1$ terms (e.g., $n_1$, $n_1 \pm 1$, or $n_1 \pm 2$) from each command line are used as terms 414, where $n_1 = \lfloor T/n \rfloor$.

Filter output sets 402, which can represent, or members of which can represent, first filter outputs 320 or other filter outputs described herein, can be computed by convolving term representations 416 with a filter 420, e.g., a convolution kernel or cross-correlation kernel. (The use of the term "correlation" for brevity permits, but does not require, flipping the kernel before applying it.) In section 418(1), filter 420(1) is shown as a 2×5 arrangement of coefficients. Filter 420(1) is applied to terms of a first subset 422(1) of the term representations 416 by element-wise multiplication and addition. Denoted as a dot product, that is subset·filter (or vice versa)=[1 4 1 5 9 2 6 5 3 5]·[2 7 1 8 2 8 1 8 2 8]=197. Similarly, filter 420(1) is applied to first subset 422(6) as [8 3 2 7 9 5 0 2 8 8]·[2 7 1 8 2 8 1 8 2 8]=249, and to first subset 422(T−1) as [5 8 2 0 9 7 4 9 4 4]·[2 7 1 82 81 8 2 8]=258. The number of first subsets 422 is T−1 since each first subset 422 is applied to two consecutive term representations 416. In some examples, edge padding or extending is used to add data so that T first subsets 422 can be determined.

Filter outputs in filter output sets 402 are shown in two forms. In both forms, empty boxes represent values omitted from the diagram for the sake of brevity. Form 424 is the raw convolution or cross-correlation output. Form 426 is the value from form 424 rescaled or transformed, in this example as $V_{426}$=tan h($V_{424}$/1000). Other rescaling operations can be used, e.g., the logistic function or rectification (e.g., a rectified linear unit, ReLU). A ReLU can include the operation f(x)=max(0,x). Clamping, thresholding, or baseline-shifting operations can additionally or alternatively be used in determining values in form 426.

In some examples, a value in form 426 is determined by applying at least one of a weight, a bias, and a nonlinearity to the corresponding value in form 424. For example, the $i^{th}$ value $v_{426,i,1}$ of filter output set 402(1) in form 426 can be determined from the corresponding value $v_{424,i,1}$ in form 424 as in Eq. (1).

$$v_{426,i,1} = f(\text{weight} \cdot v_{424,i,1} + \text{bias}) \quad (1)$$

In some examples, weight=1.0. In some examples, bias=0.0.

In section 418(F), similarly, 3×5 second filter 420(F) is applied via the dot product to 3×5-element second subsets 428(1)-428(T−2) to provide elements of filter output set 402(F). Outputs are shown in forms 424 and 426 (e.g., using Eq. (1) to determine $v_{426,i,F}$), as noted above with reference to section 418(1). Other techniques described herein with reference to section 418(1) can additionally or alternatively be used, e.g., padding or extending at the edges of the representations 416.

Figure 5:
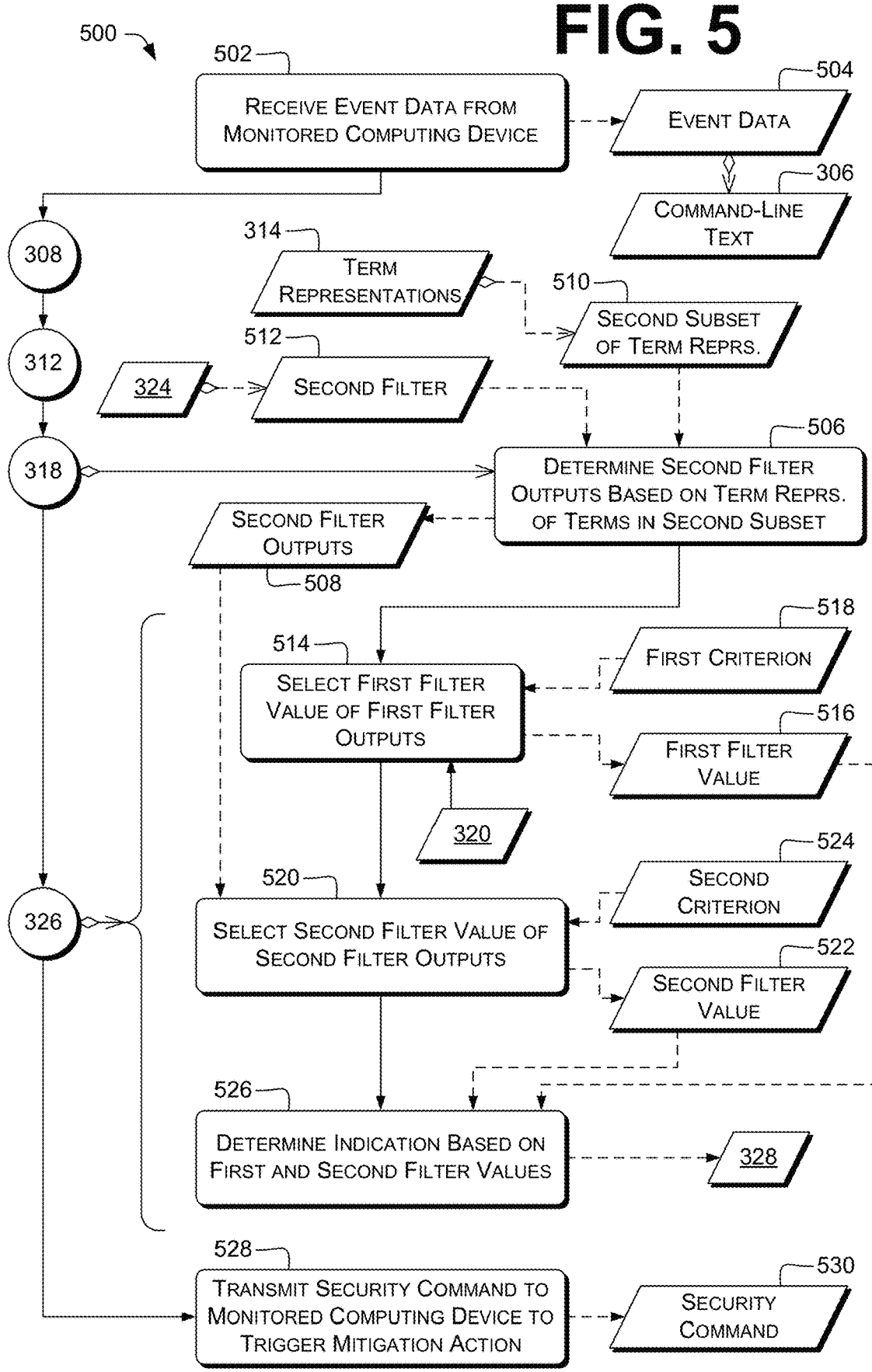
FIG. 5 is a dataflow diagram that illustrates example techniques for operating computational model(s) and interfacing, for use of those model(s), between, e.g., a monitored computing device and a security service.

FIG. 5 is a dataflow diagram that illustrates an example technique 500 for operating CM(s), and related dataflow (shown dashed for clarity). In some examples, technique 500 can be performed by a control unit, as described herein, e.g., of a computing device 102. In some examples, operation 502 can be followed by operation 308; operation 318 can include operation 506; operation 326 can include operations 514-526; or operation 326 can be followed by operation 528.

At 502, the communications module 232 can receive event data 504 from the monitored computing device 104 via a network 108. Event data 504 can include at least some of the command-line text 306. Event data 504 can be, include, or be a portion of an event record 112 associated with an event 302.

At 506, the classification subsystem 246 can determine two or more second filter outputs 508. Each second filter output 508 can be determined based at least in part on the respective term representations 314 of terms 310 in a second subset 510 of the two or more terms 310. For example, a second filter 512 of the filter(s) 324 can be used to determine the second filter outputs 508. Examples include second filter outputs of filter output set 402(F), FIG. 4.

As noted above, at 318, the classification subsystem 246 can determine two or more filter outputs 320, e.g., first filter outputs. In some examples, operation 318 can include operation 506 of determining the second filter outputs 508. Operation 318 can include determining any number of filter outputs for each of a plurality of filters 324, in some examples.

At 514, the classification subsystem 246 can select a first filter value 516 of the first filter outputs 320 according to a first predetermined selection criterion 518. Examples of selection criterion 518 can include, e.g., selecting the value having the highest or lowest value or magnitude.

At 520, the classification subsystem 246 can select a second filter value 522 of the second filter outputs 508 according to a second predetermined selection criterion 524. The second criterion 524 can be the same as, or different from, the first criterion 518. Operations 514 and 520 are mutually independent: neither requires as input an output of the other. Therefore, operations 514 and 520 (and, likewise, other mutually independent sets of operations described herein) can be performed in either order, in parallel, or at least partly overlapping in time, in various examples.

At 526, the classification subsystem 246 can determine the indication 328 at least partly by providing the first filter value 516 and the second filter value 522 as inputs to the classification CM 224.

In some examples, the classification CM 224 comprises a neural network (NN) having the first filter value 516 and the second filter value 522 as inputs and the indication 328 as an output. The NN can produce other outputs, in some examples. The NN can include a softmax, threshold, clipping, clamping, or other operation to output(s) from neuron outputs of the output layer. Examples of NNs are described herein with reference to FIG. 10.

At 528, the communications module 232 can transmit, in response to the indication that the event 302 is associated with a security violation, a security command 530 to the monitored computing device 104 to cause the monitored computing device 104 to perform a mitigation action.

In some examples, e.g., in response to receipt of the security command 530, the mitigation module 234 running at the monitored computing device 104 can quarantine a file or other data stream indicated in the security command 530 (e.g., a data stream associated with the event 302). For example, the mitigation module 234 can move, rename, archive, or encrypt, the data stream, or otherwise prevent the data stream from being, e.g., loaded or accessed. The mitigation module 234 can additionally or alternatively alter or remove settings, e.g., registry keys or inittab entries, to prevent operating system 216 from loading the data stream. Additionally or alternatively, the mitigation module 234 can terminate a process, e.g., a process associated with the event 302.

FIG. 6 is a dataflow diagram that illustrates an example technique 600 for determining and operating CM(s), and related dataflow (shown dashed for clarity). In some examples, technique 600 can be performed by a control unit, as described herein, e.g., of a computing device 102. In some examples, operation 318 can include operations 604 and 608; operation 612 can precede operation 326; or operation 326 can include operation 620.

In some examples, the trained representation mapping 316 comprises an x2vec mapping 602. The term "x2vec" is used herein for brevity to designate word2vec, doc2vec, and similar models. An x2vec model comprises a hidden layer and an output layer and is trained in an unsupervised or substantially unsupervised manner. The x2vec mapping 602 comprises at least some of the coefficients of the hidden layer. For example, in a skip-gram word2vec mapping, the model is trained to predict the probability that a pair of terms 310 in a corpus will occur within a certain number of terms of each other. The word2vec-based x2vec mapping 602 comprises the coefficients of the hidden layer, and maps terms 310, e.g. in a one-hot encoding, to term representations 316. In some examples of x2vec mapping 602, two terms 310 have relatively more similar term representations 314 if they occur together relatively more commonly than if they occur together relatively less commonly. In some examples, representation mapping 316 is trained or determined separately from the training discussed below with reference to operation 612.

At 604, in some examples, the first filter outputs 320 are determined at least partly by convolving a first predetermined filter 606, which can represent a filter 324, 420, with the respective term representations 314 of the terms 310 in the first subset 322. For example, the term representations 314 can be x2vec-determined representations.

At 608, the second filter outputs 508 are determined at least partly by convolving a second predetermined filter 610, which can represent a filter 324, 420, with the respective term representations 314 of the terms 310 in the second subset 510. For example, the term representations 314 can be x2vec-determined representations. Operations 604 and 608 are mutually independent.

At 612, the training module 228 can determine a trained classification CM 614 (which can represent trained classification CM 224) at least partly by training an initial classification CM 616 on predetermined classification training data 618 to provide the trained classification CM 224. Initial classification CM 616 can include a neural network or other CM initialized with random parameter values, in some examples. Classification training data 618 can include duplicate data samples or not. In some examples, classification training data 618 includes at most one occurrence of any particular event 302. In some examples, classification training data 618 includes at most one occurrence of any particular command-line text 306, 404. In some examples, classification training data 618 includes at most one occurrence of any particular (per-process) command line (e.g., command lines 406-410).

In some examples, classification training data 618 includes, per class label, at most one occurrence of any particular command-line text 306, 404, or of any particular (per-process) command line (e.g., command lines 406-410). For example, the command line 406 "whoami" may occur exactly twice in classification training data: a first time in association with a clean event 302, and a second time in association with a dirty event 302. In another example, the command-line text 404 (c:\browser.exe; cmd/c "net view localhost"; net view \\localhost) may occur exactly twice in classification training data: a first time in association with a clean event 302, and a second time in association with a dirty event 302.

Figure 10:
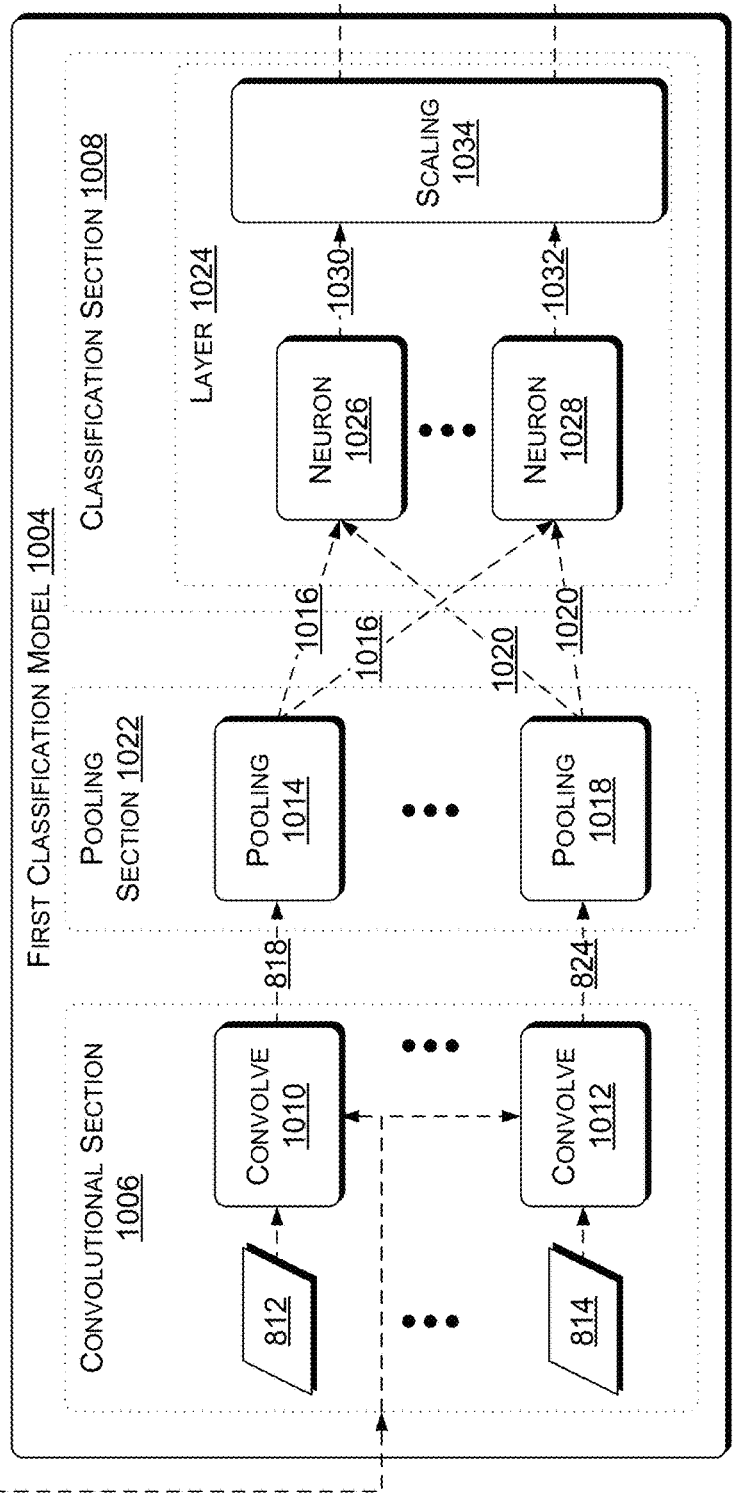
FIG. 10 illustrates an example classification computational model useful for determining whether an event is associated with a security violation, and related data.

In some examples, the classification CMs 614, 616 include computational structures such as those depicted in FIG. 10, e.g., a convolutional section 1006, a pooling section 1022, or a classification section 1008. In some examples, e.g., some examples including all three of those sections, training can be performed using backpropagation to determine parameters of the convolutional section 1006, the classification section 1008, or both. Examples are discussed herein, e.g., with reference to FIG. 10.

In some examples, the classification CMs 614, 616 include decision trees or forests. Operation 612 can include training trees or forests via recursive partitioning, boosting, bagging, RANDOM FOREST or xgboost training, or other techniques for building decision trees based, e.g., on feature values in classification training data 618, and term representations 314. In some examples of regression trees, each leaf can hold a numerical value, e.g., of +1 to indicate association with a security violation, or −1 to indicate lack of such an association. Other values can be used, e.g., zero and one. In some examples of classification trees, each leaf can include an output, e.g., a bit or other discrete value, indicating whether the corresponding term subset is considered by the corresponding decision tree to be clean or dirty.

In some examples, at operation 612, the training module 228 can perform a supervised learning technique or routine to determine the trained classification CM 614, e.g., using ground-truth data represented in classification training data 618. For example, classification training data 618 can include events 302 or command-line texts 306 collected at monitored computing device(s) 104 or other computing device(s), together with, for each item 302, 306, a respective benign vs. malicious indication (or other classification 116 or result record 124), e.g., determined by entit(ies) 120. In some examples, classification training data 618 can include substantially equal numbers of benign and malicious samples. In other examples, classification training data 618 can include a number of benign samples that is substantially different from the number of malicious samples. In still other examples, classification training data 618 can include some repeats, selected at random, to control the ratio of benign data to malicious data in the classification training data 618. In some examples, the number of benign samples in classification training data 618 is higher than the number of malicious samples, e.g., by about 5%, about 10%, or about 15%.

In some examples, at operation 612, the training module 228 can perform an unsupervised learning technique or routine in addition to or instead of a supervised learning technique or routine. For example, unsupervised learning can be used to train a sub-classifier, and a smaller amount of labeled data than would be required for full supervised learning can be used to train a model from sub-classifier results to indication 328 (e.g., as in Radford et al., "Learning to Generate Reviews and Discovering Sentiment," arXiv: 1704.01444v2 [cs] 6 Apr. 2017, incorporated herein by reference).

The training module 228 can determine the trained classification CM 614 to output classifications 116, e.g., with at least a predetermined level of accuracy, for the classification training data 618. In some examples, the training module 228 can perform minibatch-based training, e.g., with randomly-selected minibatches of the classification training data 618. In some examples, the training module 228 can run at least one training epoch, then validate using a validation set. In some examples, the training module 228 can test performance of the classification CM 614 on the validation set during training to reduce the probability of overfitting. Even if the classification CM 614 is very accurate on the classification training data 618, the training module 228 may retrain or adjust the classification CM 614 if it is not very accurate on the validation set.

In some examples, training operations, e.g., gradient-descent epochs, can be repeated as long as accuracy on the validation set is improving as training proceeds, and can terminate when accuracy on the validation set ceases to improve as training proceeds. This can permit detecting overfitting, e.g., when accuracy on the validation set ceases to improve. Avoiding overfitting can permit determining CMs that have a higher probability of successfully determining whether events are associated with security violations, even for command lines not represented in the training data ("unseen samples"). In some examples, the number of epochs can be between 100 and 300, or between 100 and 500.

At 620, the classification subsystem 246 can determine the indication 326 by operating the trained classification CM 614. For example, the classification subsystem 246 can provide the filter outputs 320, 508 (which can be determined using x2vec-derived term representations 314) as inputs to the trained classification CM 614.

Figure 7:
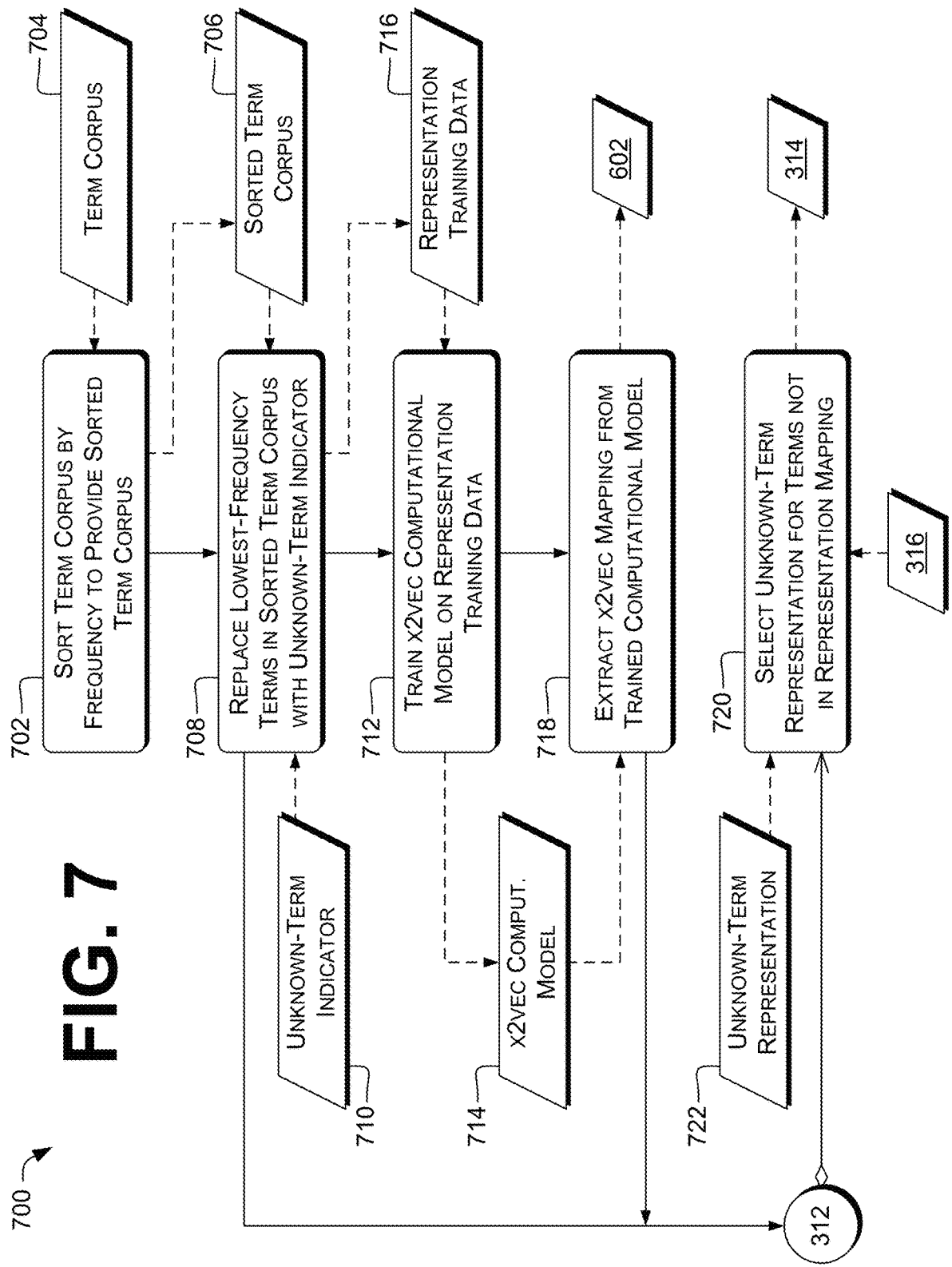
FIG. 7 is a dataflow diagram that illustrates example techniques for determining and operating computational model(s), e.g., for determining representation mappings.

FIG. 7 is a dataflow diagram that illustrates example techniques 700 for determining and operating CM(s), and related dataflow (shown dashed for clarity). In some examples, techniques 700 can be performed by a control unit, as described herein, e.g., of a computing device 102. In some examples, operation 708 can precede operation 312; operation 718 can precede operation 312; or operation 312 can include operation 720. Some examples of technique 700 can be used to determine the x2vec mapping 602.

At 702, the training module 228 can sort a term corpus 704 by frequency to provide a sorted term corpus 706. The term corpus 704 and the sorted term corpus 706 can have attributes of, or otherwise represent, corpus(es) described herein with reference to operation 312. The frequency can include a frequency of occurrence in term corpus 704, a term-frequency/inverse document frequency (TF-IDF) of the term with respect to a term corpus 704 including multiple documents, or another measure of frequency. In some examples, no stopword processing or stemming is applied to the term corpus 704. Operation 702 can include rearranging data of the term corpus 704 in memory, adjusting links in a linked list or other data structure representing term corpus 704 in memory, or recording frequency information without actually performing any data rearrangement.

The term corpus can include, e.g., terms extracted (e.g., per operation 308) from data collected by a security service system, e.g., data of benign- or malicious-process command-line text (e.g., command-line text 306). In some examples, term corpus 704 can include terms extracted from individual command lines, or from groups of command lines such as command-line text 404.

At 708, the training module 228 can replace the K lowest-frequency (e.g., least-commonly-occurring) terms 310 in the sorted term corpus 706 with an unknown-term indicator 710 to provide the predetermined representation training data 716, for $K \in \mathbb{Z} \geq 2$. The unknown-term indicator can be, e.g., a string that is not a valid term under the extraction rules defined by operation 308 or as otherwise discussed herein. In an example in which terms match $\$t=qr\{\backslash w+|[^\backslash w\backslash s]+\}$, the unknown-term indicator can be the string "u t", which does not match any term extracted using $t. Additionally or alternatively, in a system in which $qr\{\backslash w\}$ only matches ASCII characters, a Unicode or other non-ASCII character can be used in the unknown-term indicator 710. Using unknown-term indicator 710 for low-frequency terms 310 can reduce or centralize noise that might otherwise be introduced while determining a term representation 314 for a low-frequency term.

At 712, the training module 228 can train an x2vec CM 714 on predetermined representation training data 716; and At 718, the training module 228 can extract the x2vec mapping 602 from the x2vec CM 714 after the training (operation 712).

At 720, the representation subsystem 244 can determine the term representations 314 at least partly by determining, for any term 310 not found in the representation mapping 316, the term representation 314 to be an unknown-term representation 722 (denoted "$\mathbb{U}$" for clarity) (e.g., in Perl, $term_representations{$term}//$\mathbb{U}$ ). This can reduce noise while retaining the spatial relationships between terms. For example, "ls -1" and "ls 1" are very different in operation. If, hypothetically, "-" were not found in the representation mapping 316, using unknown-term representation 722 in its place would preserve the fact of the distinction, even if not the specific nature of the distinction (qw{ls $\mathbb{U}$ 1} vs. qw {ls 1}).

Figure 8:
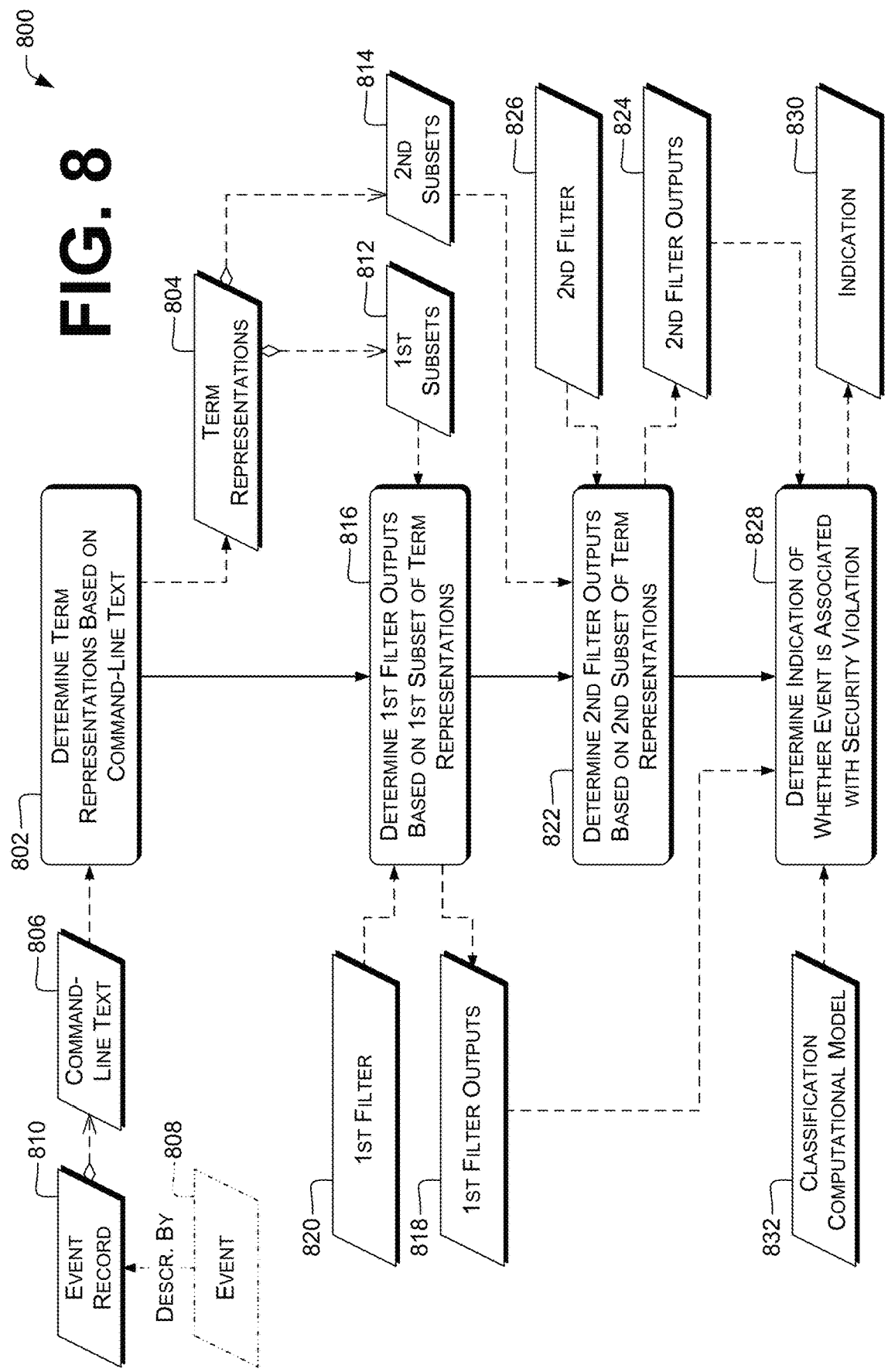
FIG. 8 is a dataflow diagram that illustrates example techniques for operating computational model(s), e.g., to determine whether an event is associated with a security violation.

FIG. 8 is a dataflow diagram that illustrates an example technique 800 for operating CM(s), and related dataflow (shown dashed for clarity). In some examples, technique 800 can be performed by a control unit, as described herein, e.g., of a computing device 102. Instructions to implement technique 800 can be stored on at least one tangible, non-transitory computer-readable medium.

At 802, the representation subsystem 244 can determine at least two term representations 804 (which can represent term representations 314) based at least in part on command-line text 806 (which can represent command-line text 306) associated with an event 808 (which can represent event 302). For example, the representation subsystem 244 can determine the term representations 804 based on data in an event record 810 (which can represent event record 112) that includes the command-line text 806. Event record 810 can describe event 808, in some examples. The event 808 can be associated with a monitored computing device 104. Examples are discussed herein, e.g., with reference to operations 308 and 312.

In some examples, the command-line text 806 comprises a command line of a first process, the first process being a process that triggered the event, a command line of a second process that is a parent process of the first process, and a command line of a third process that is a parent process of the second process. Examples are discussed herein, e.g., with reference to FIG. 3, operation 308, and FIG. 4, command-line text 404 and command lines 406, 408, and 410.

In some examples, a word2vec or similar technique is used to determine term representations. In some examples, operation 802 can include determining a first term representation of the at least two term representations 804 at least partly by extracting a first term from the command-line text 806 associated with the event 808. Examples are discussed herein, e.g., with reference to operation 308 or FIG. 4. Operation 802 can also include determining a first term representations 804 of the at least two term representations 804 by mapping the first term through a representation mapping, e.g., a LUT. Examples are discussed herein, e.g., with reference to operation 308, representation mapping 316, FIG. 4, x2vec mapping 612, or operation 718.

In some examples, the at least two term representations 804 can include a plurality of first subsets 812 and a plurality of second subsets 814. The first subsets 812 and the second subsets 814 can share elements in common, although this is not required. In some examples, the first subsets 812 are groups of the term representations 804 taken two at a time, e.g., first subsets 422(1)-422(T−1) for T term representations without edge padding. In some examples, the second subsets 814 are groups of the term representations 804 taken three at a time, e.g., second subsets 428(1)-428(T−2). Examples are discussed herein, e.g., with reference to FIGS. 4, 6, and 8.

At 816, the classification subsystem 246 can determine two or more first filter outputs 818 by a applying a first filter 820 to respective, different first subsets 812 of the at least two term representations 804. Each of the first subsets 812 can have a first size (e.g., 2, 3, or 4 associated with the first filter 820 (e.g., size 2 for first subsets 422).

The first subsets 812 can be overlapping or nonoverlapping, or can be unique or not, provided that each first subset 812 differs in at least one term representation 804 from each other first subset 812. In some examples, replicates of one or more of the first subsets 812 can be processed, without limitation.

At 822, the classification subsystem 246 can determine two or more second filter outputs 824 by a applying a second filter 826 to respective, different second subsets 814 of the at least two term representations 804. Each of the second subsets 814 can have a second size associated with the second filter 826 (e.g., size 3 for second subsets 428). The first size can be different from the second size. Operations 816 and 822 are mutually independent. As noted above with respect to the first subsets 812, the second subsets 814 can be overlapping or nonoverlapping, or unique or not. In some examples, replicates of one or more of the second subsets 814 can be processed, without limitation.

At 828, the classification subsystem 246 can determine an indication 830 (which can represent indication 328) of whether the event 808 is associated with a security violation. Operation 828 can include operating a classification computational model (CM) 832 (which can represent classification CM 224, 614) based at least in part on the two or more first filter outputs 818 and the two or more second filter outputs 824.

Some examples use a pooling or other aggregation or selection operation to process filter outputs 818, 824. In some examples, operation 816 includes selecting a first filter value of the first filter outputs according to a first predetermined selection criterion. For example, operation 816 can include selecting the highest-valued of the first filter outputs 818 as the first filter value. Operation 822 includes selecting a second filter value of the second filter outputs according to a second predetermined selection criterion, which can be the same as, or different from, the first criterion. For example, operation 822 can include selecting the highest-valued of the second filter outputs 824 as the second filter value. Operation 828 includes determining the indication at least partly by providing the first filter value and the second filter value as inputs to the classification CM. Examples are discussed herein, e.g., with reference to FIG. 5 operations 514, 520, and 526; criteria 518 and 524; and filter values 516 and 522.

Figure 9:
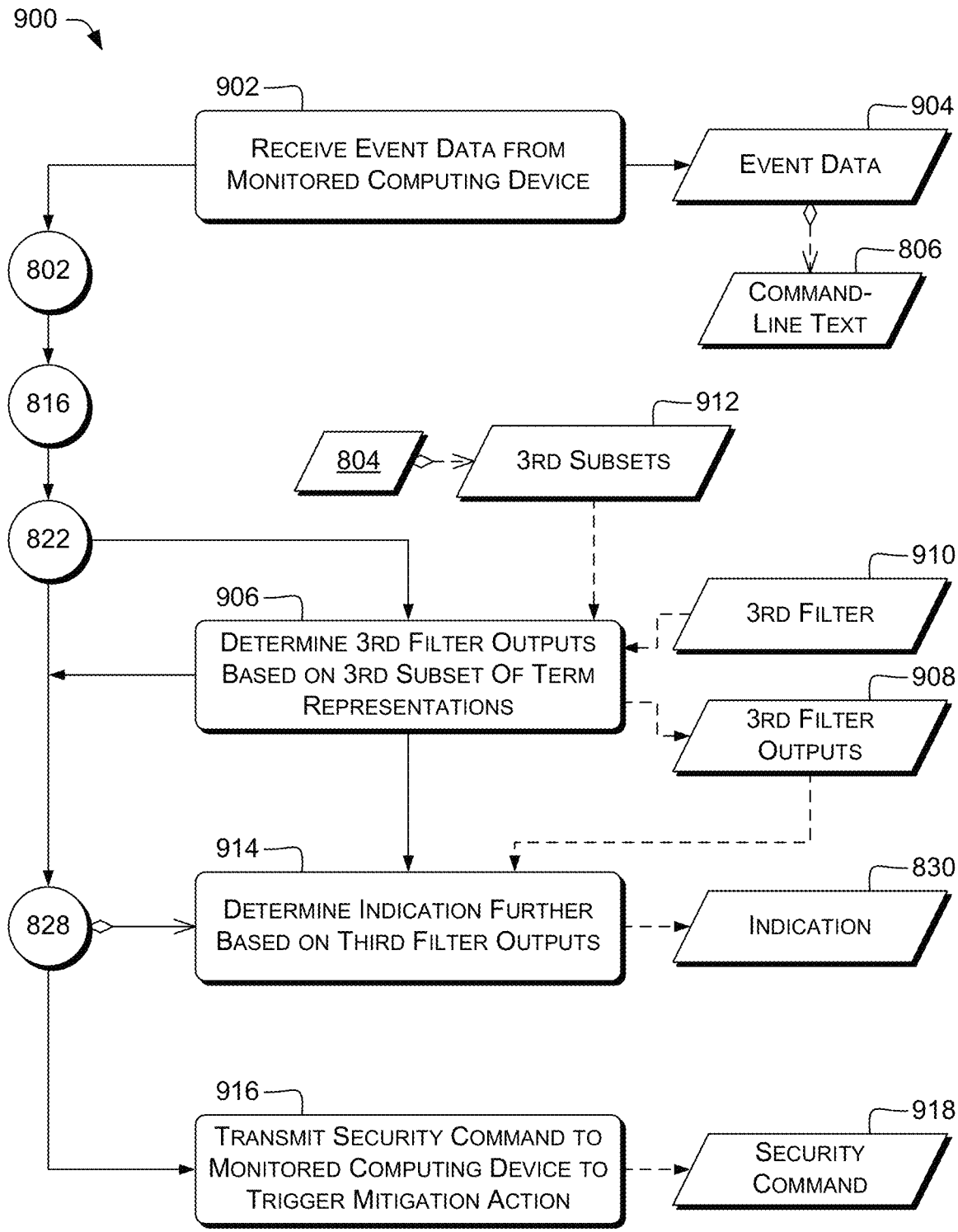
FIG. 9 is a dataflow diagram that illustrates example techniques for operating computational model(s) and interfacing for use of those model(s) between, e.g., a monitored computing device and a security service.

FIG. 9 is a dataflow diagram that illustrates an example technique 900 for operating CM(s), and related dataflow. In some examples, technique 900 can be performed by a control unit, as described herein, e.g., of a computing device 102. In some examples, operation 902 can precede operation 802; operation 822 can be followed by operation 906; operation 906 can be followed by operation 828; operation 828 can include operation 914; or operation 828 can be followed by operation 916.

At 902, the communications module 232 can receive event data 904 (which can represent event record 112, 810 or a portion thereof) from the monitored computing device 104 via a network 108. The event data 904 can include at least some of the command-line text 806. Examples are discussed herein, e.g., with reference to operation 502.

At 906, the classification subsystem 246 can determine two or more third filter outputs 908 by applying a third filter 910 to respective, different third subsets 912 of the at least two term representations 804. Each of the third subsets 912 can have a third size associated with the third filter 910. In some of these examples, the first size is two terms, the second size is three terms, and the third size is four terms. For example, each of the third subsets can include four consecutive term representations 416.

At 914, the classification subsystem 246 can determine the indication 830 further based at least in part on at least one of the third filter outputs 908. Examples are discussed herein, e.g., with reference to operations 318 and 526. Operation 906 or 914 can include selecting a filter value of the third filter outputs 918 using a pooling or other aggregation or selection operation, e.g., based on a predetermined criterion Examples are discussed herein, e.g., with reference to FIG. 8. Operations 816, 822, and 914 are mutually independent.

At 916, the communications module 232 can, e.g., in response to the indication 830 that the event 808 is associated with a security violation, transmit a security command 918 to the monitored computing device 104 to cause the monitored computing device 104 to perform a mitigation action. Examples are discussed herein, e.g., with reference to operation 528.

FIG. 10 is a dataflow diagram that illustrates example data structures 1000 for CM(s) 114, dataflow through the structures (shown dashed for clarity), and related data items. In some examples, data structures 1000 can be determined or operated by a control unit, as described herein, e.g., of a computing device 102, e.g., in response to instructions of training module 228 or operation module 230. In some examples, a computer-security system uses feature vectors 1002 but not first classification model 1004, or vice versa, or uses both 1002 and 1004. In some examples, training operations described herein with reference to FIG. 6, 7, or 10 can be carried out on a schedule, e.g., weekly or monthly; on expiration of a predetermined validity period of CM(s) 220; or when an accuracy of CM(s) 220 has degraded to a predetermined threshold. As depicted by the ellipses, the number of inputs, input sets, or operation units shown herein is not limiting; the number shown can be used, or more than the number shown can be used, for any input, input set, or operation unit, or any combination of those shown.

In some examples, each of the at least two term representations 804 (or, likewise, 314, 416, or 614) comprises a respective feature vector 1002. In the example of FIG. 4, each feature vector has five elements, although this is not limiting.

In some examples, a first classification model 1004 (which can represent CM 224, 614, 832) includes a convolutional section 1006 and a classification section 1008. In some examples, a trained classification computational model includes classification section 1008. In some examples, convolutional section 1006 determines filter outputs, e.g., as discussed herein with reference to at least FIG. 4 or operations 318, 604, 608, 816, or 822. In some examples, pooling section 1022 or convolutional section 1006 determines filter values, e.g., as discussed herein with reference to operation 514 or 520. In some examples, those filter values are provided as input to the model including classification section 1008, e.g., as discussed herein with reference to operation 526.

The convolutional section 1006 can be configured to determine at least two filter outputs 818, 824, 908 (and likewise filter outputs 320, 508) of respective filters 820, 826, 910 (and likewise filters 324, 420, 512, 606, 610) of at least two filters by convolving the respective filters 820, 826, 910 with the at least two term representations 804. Examples are discussed herein, e.g., with reference to FIG. 4 and operations 604, 608, 816, and 822. Shown are convolution 1010 producing first filter outputs 818 using first filter 820 and second convolution 1012 producing second filter outputs 824 using second filter 826.

In the illustrated example, the at least two first filter outputs 818 (e.g., filter output set 402(1)) are provided to a pooling operator 1014, which can provide a first filter value 1016 (which can represent first filter value 516). The at least two second filter outputs 824 (e.g., filter output sets 402(F)) are provided to a pooling operator 1018, which can provide a second filter value 1020 (which can represent second filter value 522). The first filter value 1016 and the second filter value 1020 are the inputs of the fully-connected layer 1024. Examples of pooling operators 1014, 1018 are described herein with reference to operation 828. Pooling operators 1014, 1018 can be part of convolutional section 1006, part of classification section 1008, part of neither, or divided between the two. In the illustrated example, pooling operators 1014, 1018 are part of neither, but are instead part of a pooling section 1022.

The classification section 1008 can be configured to determine the indication 830 (and likewise indication 328) as a probability based at least in part on the at least two filter outputs 818, 824, 908, e.g., based on filter values 1016, 1020. For example, the classification section 1008 can include a fully-connected layer 1024 whose neurons' outputs represent the probabilities of various classifications, e.g., scaled using softmax. This is not limiting; other connectivity patterns of an output layer can be used. Shown are two neurons 1026, 1028 having respective outputs 1030, 1032, although any number ≥1 of neurons can be used. The inputs to the fully-connected layer 1024 can be, or can be derived from, outputs of the convolutional section 1006 such as filter outputs 818, 824, 908. In this example, the inputs to the fully-connected layer 1024 are the filter values 1016, 1020. The neuron outputs 1030, 1032 in the illustrated example are scaled by a scaling operation 1034, e.g., softmax. In some examples, scaling operation 1034 is subsequent to layer 1024 instead of part of layer 1024.

In some examples, each neuron 1026, 1028 has, as parameters: a weight for each input, and a bias. The output of each neuron 1026, 1028 can be, e.g., the sum of the bias and, for each input, the weight for that input times the value of that input. In the illustrated example, the raw sums are scaled using softmax or another function (operation 1034).

The outputs from the scaling operation 1034 are, e.g., values 1036, 1038 representing probabilities that the event 808 falls into respective categories, e.g., associated with a security violation or not associated with a security violation. In some examples, the number of neuron outputs is unity, representing one of those options, or more than two, e.g., representing "not associated," "associated with a violation of type 1," "associated with a violation of type 2," etc. In some examples, indication 830 includes at least one of values 1036 and 1038.

As noted above with reference to operation 612, in some examples, first classification model 1004 is trained separately from x2vec (e.g., word2vec) representation mapping 602 or other representation mappings 316. In some examples, term representations 314, 804 or representation mappings 316, 602 are fixed before training of classification model 1004. In some examples, the operation of pooling section 1022 (e.g., a max( )operation) is fixed before training of classification model 1004. In some examples, both term representations 314, 804 and the operation of pooling section 1022 are fixed before training of classification model 1004. Training of classification model 1004 can then be performed via backpropagation using classification training data 618 to determine the filters 420 used by convolutional section 1006, weight or bias parameters used in Eq. (1) (if Eq. (1) is used), and the neuron parameters used in layer 1024. In some examples, dropout is used so that, during at least some of the forward propagation steps, randomly-selected ones of the neurons 1026, 1028 are adjusted so that only some of the inputs to those neurons 1026, 1028 are used in computing that neuron's output. Examples are given in Kim, "Convolutional Neural Networks for Sentence Classification," arXiv:1408.5882v2 [cs.CL] 3 Sep. 2014, incorporated herein by reference.

In some examples, at least one of the following is not fixed before training of classification model 1004: term representations 314, 804; representation mappings 316, 602; or the operation of pooling section 1022. For example, pooling section 1022 can include a parametric ReLU (PReLU) or an exponential linear unit (ELU) that includes a tuning parameter that can be adjusted by training module 228 during training of CM 1004.

FIG. 11 is a dataflow diagram that illustrates an example technique 1100 for operating CM(s), and related dataflow (shown dashed for clarity). In some examples, technique 1100 can be performed by a control unit, as described herein, e.g., of a computing device 102. In some examples, operation 828 can include any or all of operations 1104-1112.

Some examples of technique 1100 use a common representation mapping 222 and multiple classification computational models 224. Two CMs 224 are shown here for brevity, but any number ≥1 can be used. In some examples, the computer-readable memory 214 stores a second classification model 1102 (e.g., a CM). The classification subsystem 246 can be configured to use first classification model 1004 and second classification model 1102 together. Operations 1104 and 1112 are mutually independent.

At 1104, the classification subsystem 246 can determine a first classification 1106 of the event 808 by providing the at least two term representations 804 as input to the first classification model 1004.

In the illustrated example, first classification model 1004 includes a neural network. The operation module 230 can perform operation 1104 at least partly by applying multiplication, summing, and activation functions to successive layers of the neural network, as discussed herein with reference to FIG. 10. Operation module 230 can provide the outputs of each layer, transformed based on edge weights, as inputs to the next layer. Operation module 230, e.g., classification subsystem 246, can perform similar operations to use other neural networks described herein.

At 1108, the classification subsystem 246 can determine a second classification 1110 of the event 808 by providing the at least two term representations 804 as input to the second classification model 1102. In examples in which the second classification model 1102 includes a decision tree, the operation module 230 can perform successive tests for specific characteristics of the term representations 804 while traversing the decision tree. In some examples in which the second classification model 1102 includes a decision forest, the operation module 230 can perform successive tests for specific characteristics of the term representations 804 while traversing each decision tree, and can provide the second classification 1110 indicating, e.g., the mode (most common) of the results of traversing the trees, or a summation of the individual decision values of each tree. In some examples of classification, each leaf can include respective weight values for one or more classes. The operation module 230 can sum the weights for each class over all the trees and pick the class with the highest total weight as second classification 1110. In some examples, the operation module 230 can apply a logistic or other squashing function, e.g., to each weight before summing or to the sums of the weights. Operation module 230, e.g., classification subsystem 246, can perform similar operations to use other decision trees or forests described herein.

At 1112, the classification subsystem 246 or other components of operation module 230 can determine the indication 830 that the event 808 is associated with a computer-security violation. Operation 1112 can be performed in response to at least one of the first classification 1106 or the second classification 1110 indicating that the event is associated with a computer-security violation.

In some examples, operations 1104 and 1108 draw from term representations 804 determined using a single representation mapping 316. In the illustrated example, the term representations 804 include first-mapping representations 1114 determined using a first representation mapping 316 and second-mapping representations 1116 determined using a second, different representation mapping 316. For example, the first and second representation mappings can be determined based on respective, different sets of training data. This can permit using the first representation mapping 316 and the first classification model 1004 to detect some types of malicious behavior, e.g., malware, and using the second representation mapping 316 and the second classification model 1102 to detect other types of malicious behavior, e.g., targeted attacks.

Illustrative Examples

In various illustrative examples, 300-element feature vectors are used. The representation mapping 316 is an x2vec mapping 602. Multiple classification models 224 are used as in operation 1112, each having the structure of first CM 1004 and using three filters 324 in the convolutional section 1006. One of the classification models 224 uses filter sizes of 2, 3, and 4 for its filters 324, respectively, and the other of the classification models 224 uses filter sizes of 3, 4, and 5 for its filters 324, respectively. Two representation mappings are used for respective ones of the classification models 224, as discussed herein with reference to representations 1114 and 1116. Each of the classification models 224 can be trained using classification training data 618 that includes data both of benign command lines 306 and of malicious command lines 306.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method (e.g., a technique) of determining whether an event associated with a monitored computing device is associated with a security violation, the method comprising: extracting at least two terms from command-line text associated with the event, the command-line text comprising at least two command lines associated with the event; determining respective term representations of the at least two terms based at least in part on a trained representation mapping; determining two or more first filter outputs, each first filter output determined based at least in part on the respective term representations of terms in a first subset of the two or more terms; determining an indication of whether the event is associated with a security violation at least partly by operating a trained classification computational model (CM) based at least in part on the two or more first filter outputs.

B: The method according to paragraph A, further comprising: receiving event data from the monitored computing device via a network, the event data comprising at least some of the command-line text; and in response to the indication that the event is associated with a security violation, transmitting a security command to the monitored computing device to cause the monitored computing device to perform a mitigation action.

C: The method according to paragraph A or B, further comprising: determining two or more second filter outputs, each second filter output determined based at least in part on the respective term representations of terms in a second subset of the two or more terms; selecting a first filter value of the first filter outputs according to a first predetermined selection criterion; selecting a second filter value of the second filter outputs according to a second predetermined selection criterion; and determining the indication at least partly by providing the first filter value and the second filter value as inputs to the classification CM.

D: The method according to paragraph C, wherein: the trained representation mapping comprises an x2vec mapping; the first filter outputs are determined at least partly by convolving a first predetermined filter with the respective term representations of the terms in the first subset; the second filter outputs are determined at least partly by convolving a second predetermined filter with the respective term representations of the terms in the second subset; and the classification CM comprises a neural network (NN) having the first filter value and the second filter value as inputs and the indication as an output.

E: The method according to paragraph D, further comprising: determining the x2vec mapping at least partly by: training an x2vec CM on predetermined representation training data; and extracting the x2vec mapping from the x2vec CM after the training; and determining the trained classification CM at least partly by training an initial classification CM on predetermined classification training data to provide the trained classification CM.

F: The method according to paragraph E, further comprising: sorting a term corpus by frequency of occurrence to provide a sorted term corpus; and replacing the K lowest-frequency terms in the sorted term corpus with an unknown-term indicator to provide the predetermined representation training data, for a predetermined integer K≥2.

G: The method according to any of paragraphs A-F, wherein the at least two command lines associated with the event comprise: a command line of a first process, the first process being a process that triggered the event; a command line of a second process that is a parent process of the first process; and a command line of a third process that is a parent process of the second process.

H: The method according to any of paragraphs A-G, further comprising extracting the at least two terms at least partly by: extracting, from a first command line of the at least two command lines, a contiguous sequence of punctuation characters as a first term of the at least two terms; and extracting, from the first command line, a contiguous sequence of non-punctuation characters as a second term of the at least two terms.

I: At least one tangible, non-transitory computer-readable medium having stored thereon instructions executable by at least one processor to cause the at least one processor to perform operations comprising: determining at least two term representations based at least in part on command-line text associated with an event, the event associated with a monitored computing device; determining two or more first filter outputs by a applying a first filter to respective, different first subsets of the at least two term representations, wherein each of the first subsets has a first size associated with the first filter; determining two or more second filter outputs by a applying a second filter to respective, different second subsets of the at least two term representations, wherein: each of the second subsets has a second size associated with the second filter; and the first size is different from the second size; and determining an indication of whether the event is associated with a security violation at least partly by operating a classification computational model (CM) based at least in part on the two or more first filter outputs and the two or more second filter outputs.

J: The at least one tangible, non-transitory computer-readable medium as recited in paragraph I, the operations further comprising determining a first term representation of the at least two term representations at least partly by: extracting a first term from the command-line text associated with the event; and determining a first term representations of the at least two term representations by mapping the first term through a representation mapping.

K: The at least one tangible, non-transitory computer-readable medium as recited in paragraph I or J, wherein: the first size is two terms; the second size is three terms; and the operations comprise: determining two or more third filter outputs by a applying a third filter to respective, different third subsets of the at least two term representations, wherein: each of the third subsets has a third size associated with the third filter; and the third size is four terms.

L: The at least one tangible, non-transitory computer-readable medium as recited in any of paragraphs I-K, the operations further comprising: selecting a first filter value of the first filter outputs according to a first predetermined selection criterion; selecting a second filter value of the second filter outputs according to a second predetermined selection criterion; and determining the indication at least partly by providing the first filter value and the second filter value as inputs to the classification CM.

M: The at least one tangible, non-transitory computer-readable medium as recited in paragraph L, the operations comprising: selecting the highest-valued of the first filter outputs as the first filter value; and selecting the highest-valued of the second filter outputs as the second filter value.

N: The at least one tangible, non-transitory computer-readable medium as recited in any of paragraphs I-M, wherein the command-line text comprises: a command line of a first process, the first process being a process that triggered the event; a command line of a second process that is a parent process of the first process; and a command line of a third process that is a parent process of the second process.

0: The at least one tangible, non-transitory computer-readable medium as recited in any of paragraphs I-N, the operations comprising: receiving event data from the monitored computing device via a network, the event data comprising at least some of the command-line text; and in response to the indication that the event is associated with a security violation, transmitting a security command to the monitored computing device to cause the monitored computing device to perform a mitigation action.

P: A computer-security system comprising: a computer-readable memory storing a representation mapping and a classification model; a communications interface configured to receive event data representing an event associated with a monitored computing device, wherein: the event data comprises command-line text; the event is associated with a process that has an ancestor process; the command-line text comprises a first command line associated with the process; and the command-line text comprises a second command line associated with the ancestor process; a representation subsystem configured to determine at least two term representations based at least in part on the command-line text using the representation mapping; and a classification subsystem configured to determine an indication of whether the event is associated with a computer-security violation at least partly by providing the at least two term representations as input to the classification model.

Q: The computer-security system according to paragraph P, wherein: the computer-readable memory stores a second classification model; and the classification subsystem is configured to: determine a first classification of the event by providing the at least two term representations as input to the classification model; determine a second classification of the event by providing the at least two term representations as input to the second classification model; and in response to at least one of the first classification or the second classification indicating that the event is associated with a computer-security violation, determining the indication that the event is associated with a computer-security violation.

R: The computer-security system according to paragraph P or Q, wherein: each of the at least two term representations comprises a respective feature vector; and the classification model comprises: a convolutional section configured to determine at least two filter outputs of respective filters of at least two filters by convolving the respective filters with the at least two term representations; and a classification section configured to determine the indication as a probability based at least in part on the at least two filter outputs.

S: The computer-security system according to any of paragraphs P-R, wherein: the representation mapping comprises a lookup table; and the representation subsystem is configured to: tokenize the command-line text into at least two terms; and for each of the at least two terms, look up a respective representation of the at least two term representations in the lookup table.

T: The computer-security system according to any of paragraphs P-S, wherein: the communications interface comprises a first network interface; and the system further comprises the monitored computing device having: a second network interface; and a security agent executable on the monitored computing device and configured to send at least some of the event data via the second network interface to the first network interface.

U: A computer-readable medium, e.g., a computer storage medium, having thereon computer-executable instructions, the computer-executable instructions upon execution configuring a computer to perform operations as any of paragraphs A-H, I-O, or P-T recites.

V: A device comprising: a processor; and a computer-readable medium, e.g., a computer storage medium, having thereon computer-executable instructions, the computer-executable instructions upon execution by the processor configuring the device to perform operations as any of paragraphs A-H, I-O, or P-T recites.

W: A system comprising: means for processing; and means for storing having thereon computer-executable instructions, the computer-executable instructions including means to configure the system to carry out a method as any of paragraphs A-H, I-O, or P-T recites.

X: A system as recited in any of paragraphs A-H, I-O, or P-T, further comprising at least one of, or all of, the features recited in para. [0195].

Y: Any of the preceding, with each occurrence of "at least two command lines" and similar text replaced with "at least one command line".

CONCLUSION

Various computational-model determination and operation techniques described herein, e.g., for determining and operating computational models 114, 220, can permit more efficiently determining a classification of an event. Various examples can reduce the time or memory requirements of software to determine classifications while maintaining or improving the accuracy of such determinations.

Various examples provide automated detection of security violations (e.g., targeted attacks or malware-related events) with higher confidence levels than some previous schemes. This increased confidence can permit making triage decisions based on classifications provided by systems herein (e.g., classifications 116, outputs 242, or indications 328). Accordingly, security resources can be directed to events 302 more likely to be associated with security violations. This can reduce waste of security resources and can permit more quickly responding to violations. Various examples can be used together with other systems for filtering event streams or otherwise detecting malicious events. For example, techniques 300 or 800, or other techniques herein can be used only after an event stream has been filtered or preprocessed, or vice versa.

Some examples may provide any of, or none of, the benefits listed herein, or other benefits. The claims are not limited to examples providing the benefits described above, and at least one embodiment within the scope of the claims may not provide any of the benefits described above. Furthermore, the claimed subject matter is not limited to implementations that solve any or all disadvantages noted in any part of this disclosure.

The word "or" and the phrase "or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," or any of those phrases with "or" substituted for "or," unless specifically stated otherwise, is to be understood as signifying that an item, term, etc. can be either X, or Y, or Z, or a combination of any elements thereof (e.g., a combination of XY, XZ, YZ, or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" is synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed examples. For example, computing devices 102 or 104, network 108, processing unit(s) 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer operating system (OS) 216. In other instances, the functionality or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing device(s) 102, 104, or 200, such as one or more internal or external CPUs or GPUs, or one or more pieces of hardware logic such as FPGAs, DSPs, or other types of accelerators.

What is claimed is:

1. A method of determining whether an event associated with a monitored computing device is associated with a security violation, the method comprising:
   extracting at least two terms from command-line text associated with the event, the command-line text comprising at least two command lines associated with the event;
   determining respective term representations of the at least two terms based at least in part on a trained representation mapping;
   determining two or more first filter outputs, each first filter output determined based at least in part on the respective term representations of terms in a first subset of the at least two terms;
   determining two or more second filter outputs, each second filter output determined based at least in part on the respective term representations of terms in a second subset of the at least two terms;
   selecting a first filter value of the two or more first filter outputs according to a first predetermined selection criterion;
   selecting a second filter value of the two or more second filter outputs according to a second predetermined selection criterion; and
   determining an indication of whether the event is associated with a security violation at least partly by providing the first filter value and the second filter value as inputs to a trained classification computational model (CM).

2. The method according to claim 1, further comprising:
   receiving event data from the monitored computing device via a network, the event data comprising at least some of the command-line text; and
   in response to the indication that the event is associated with a security violation, transmitting a security command to the monitored computing device to cause the monitored computing device to perform a mitigation action.

3. The method according to claim 1, wherein:
   the trained representation mapping comprises an x2vec mapping;
   the first filter outputs are determined at least partly by convolving a first predetermined filter with the respective term representations of the terms in the first subset;
   the second filter outputs are determined at least partly by convolving a second predetermined filter with the respective term representations of the terms in the second subset; and
   the classification CM comprises a neural network (NN) having the first filter value and the second filter value as inputs and the indication as an output.

4. The method according to claim 3, further comprising:
   determining the x2vec mapping at least partly by:
   training an x2vec CM on predetermined representation training data; and
   extracting the x2vec mapping from the x2vec CM after the training; and
   determining the trained classification CM at least partly by training an initial classification CM on predetermined classification training data to provide the trained classification CM.

5. The method according to claim 4, further comprising:
sorting a term corpus by frequency of occurrence to provide a sorted term corpus; and
replacing the K lowest-frequency terms in the sorted term corpus with an unknown-term indicator to provide the predetermined representation training data, for a predetermined integer K≥2.

6. The method according to claim 1, wherein the at least two command lines associated with the event comprise:
a command line of a first process, the first process being a process that triggered the event;
a command line of a second process that is a parent process of the first process; and
a command line of a third process that is a parent process of the second process.

7. The method according to claim 1, further comprising extracting the at least two terms at least partly by:
extracting, from a first command line of the at least two command lines, a contiguous sequence of punctuation characters as a first term of the at least two terms; and
extracting, from the first command line, a contiguous sequence of non-punctuation characters as a second term of the at least two terms.

8. At least one tangible, non-transitory computer-readable medium having stored thereon instructions executable by at least one processor to cause the at least one processor to perform operations comprising:
determining at least two term representations based at least in part on command-line text associated with an event, the event associated with a monitored computing device;
determining two or more first filter outputs by a applying a first filter to respective, different first subsets of the at least two term representations, wherein each of the first subsets has a first size associated with the first filter;
determining two or more second filter outputs by a applying a second filter to respective, different second subsets of the at least two term representations, wherein:
each of the second subsets has a second size associated with the second filter; and
the first size is different from the second size;
selecting a first filter value of the first filter outputs according to a first predetermined selection criterion;
selecting a second filter value of the second filter outputs according to a second predetermined selection criterion; and
determining an indication of whether the event is associated with a security violation at least partly by providing the first filter value and the second filter value as inputs to operating a classification computational model (CM).

9. The at least one tangible, non-transitory computer-readable medium as recited in claim 8, the operations further comprising determining a first term representation of the at least two term representations at least partly by:
extracting a first term from the command-line text associated with the event; and
determining a first term representations of the at least two term representations by mapping the first term through a representation mapping.

10. The at least one tangible, non-transitory computer-readable medium as recited in claim 8, wherein:
the first size is two terms;
the second size is three terms; and
the operations comprise determining two or more third filter outputs by a applying a third filter to respective, different third subsets of the at least two term representations, wherein:
each of the third subsets has a third size associated with the third filter; and
the third size is four terms.

11. The at least one tangible, non-transitory computer-readable medium as recited in claim 8, the operations comprising:
selecting the highest-valued of the first filter outputs as the first filter value; and
selecting the highest-valued of the second filter outputs as the second filter value.

12. The at least one tangible, non-transitory computer-readable medium as recited in claim 8, wherein the command-line text comprises:
a command line of a first process, the first process being a process that triggered the event;
a command line of a second process that is a parent process of the first process; and
a command line of a third process that is a parent process of the second process.

13. The at least one tangible, non-transitory computer-readable medium as recited in claim 8, the operations comprising:
receiving event data from the monitored computing device via a network, the event data comprising at least some of the command-line text; and
in response to the indication that the event is associated with a security violation, transmitting a security command to the monitored computing device to cause the monitored computing device to perform a mitigation action.

14. A computer-security system comprising:
at least one processing unit;
a computer-readable memory storing a representation mapping and a classification model;
a communications interface configured to receive event data representing an event associated with a monitored computing device, wherein:
the event data comprises command-line text;
the event is associated with a process that has an ancestor process;
the command-line text comprises a first command line associated with the process; and
the command-line text comprises a second command line associated with the ancestor process;
a representation subsystem that determines at least two term representations based at least in part on the command-line text using the representation mapping; and
a classification subsystem that determines an indication of whether the event is associated with a computer-security violation at least partly by providing the at least two term representations as input to the classification model.

15. The computer-security system according to claim 14, wherein:
the computer-readable memory stores a second classification model; and
the classification subsystem is configured to:
determine a first classification of the event by providing the at least two term representations as input to the classification model;

determine a second classification of the event by providing the at least two term representations as input to the second classification model; and in response to at least one of the first classification or the second classification indicating that the event is associated with a computer-security violation, determining the indication that the event is associated with a computer-security violation.

16. The computer-security system according to claim 14, wherein:

each of the at least two term representations comprises a respective feature vector; and the classification model comprises:

a convolutional section configured to determine at least two filter outputs of respective filters of at least two filters by convolving the respective filters with the at least two term representations; and a classification section configured to determine the indication as a probability based at least in part on the at least two filter outputs.

17. The computer-security system according to claim 14, wherein:

the representation mapping comprises a lookup table; and the representation subsystem is configured to:

tokenize the command-line text into at least two terms; and for each of the at least two terms, look up a respective representation of the at least two term representations in the lookup table.

18. The computer-security system according to claim 14, wherein:

the communications interface comprises a first network interface; and the system further comprises the monitored computing device having:

a second network interface; and a security agent executable on the monitored computing device and configured to send at least some of the event data via the second network interface to the first network interface.

* * * * *